(12) United States Patent
de Poix

(10) Patent No.: US 12,508,010 B2
(45) Date of Patent: Dec. 30, 2025

(54) MEDICAL DEVICES FOR REPAIRING PERFORATIONS IN TISSUE, METHODS OF MANUFACTURING MEDICAL DEVICES, AND METHODS OF IMPLANTING A MEDICAL DEVICE

(71) Applicant: C2DX, Inc., Schoolcraft, MI (US)

(72) Inventor: Alex de Poix, West Lafayette, IN (US)

(73) Assignee: C2DX, INC., Schoolcraft, MI (US)

( * ) Notice: Subject to any disclaimer, the term of this patent is extended or adjusted under 35 U.S.C. 154(b) by 751 days.

(21) Appl. No.: 17/226,482

(22) Filed: Apr. 9, 2021

(65) Prior Publication Data

US 2021/0315556 A1  Oct. 14, 2021

Related U.S. Application Data

(60) Provisional application No. 63/008,111, filed on Apr. 10, 2020.

(51) Int. Cl.
*A61B 17/00* (2006.01)
*A61F 11/20* (2022.01)
(Continued)

(52) U.S. Cl.
CPC ........ *A61B 17/0057* (2013.01); *A61L 31/005* (2013.01); *A61B 2017/00526* (2013.01);
(Continued)

(58) Field of Classification Search
CPC ...... A61B 17/0057; A61B 2017/00526; A61B 2017/00606; A61F 31/005; A61F 11/20; A61F 2/18; A61F 2002/183; A61L 31/048
See application file for complete search history.

(56) References Cited

U.S. PATENT DOCUMENTS 3,807,409 A  4/1974  Paparella et al.
3,888,258 A  6/1975  Akiyama
(Continued)

FOREIGN PATENT DOCUMENTS

DE  4400188 A1  7/1994
EP  3572103 A1  11/2019
(Continued)

OTHER PUBLICATIONS

International Preliminary Report on Patentability and Written Opinion, Application No. PCT/US2021/026524, dated Oct. 20, 2022.
(Continued)

*Primary Examiner* — Jerrah Edwards
*Assistant Examiner* — Maximilian Tobias Spencer
(74) *Attorney, Agent, or Firm* — Honigman LLP; Douglas H. Siegel; Jonathan P. O'Brien

(57) ABSTRACT

Medical devices for repairing perforations in tissue, such as the tissue forming the tympanic membrane, methods of manufacturing medical devices, and methods of implanting a medical device are described. An example method of manufacturing a medical device includes obtaining a first piece of material, obtaining a second piece of material, obtaining a divider defining an passageway that extends through the divider, positioning the divider between the first piece of material and the second piece of material such that the divider contacts the first piece of material and the second piece of material, attaching a portion of the first piece of material to a portion of the second piece of material within the passageway defined by the divider, and removing the divider from between the first piece of material and the second piece of material.

18 Claims, 13 Drawing Sheets

(51) Int. Cl.
*A61L 31/00* (2006.01)
*A61L 31/04* (2006.01)

(52) U.S. Cl.
CPC ..... *A61B 2017/00606* (2013.01); *A61F 11/20* (2022.01); *A61L 31/048* (2013.01)

(56) References Cited

U.S. PATENT DOCUMENTS

| | | | |
|---|---|---|---|
| 4,014,971 A * | 3/1977 | Perkins | A61L 27/3683 |
| | | | 264/222 |
| 4,031,569 A * | 6/1977 | Jacob | A61B 17/0057 |
| | | | 606/220 |
| 4,650,488 A | 3/1987 | Bays et al. | |
| 4,744,792 A | 5/1988 | Sander et al. | |
| 4,764,168 A | 8/1988 | Suh | |
| 5,053,040 A | 10/1991 | Goldsmith, III | |
| 5,466,239 A | 11/1995 | Cinberg et al. | |
| 5,496,329 A | 3/1996 | Reisinger | |
| 5,501,700 A * | 3/1996 | Hirata | A61F 11/20 |
| | | | 606/151 |
| 5,554,389 A | 9/1996 | Badylak et al. | |
| 5,643,280 A | 7/1997 | Del Rio et al. | |
| 5,643,300 A | 7/1997 | Hirata | |
| 5,755,791 A | 5/1998 | Whitson et al. | |
| 6,241,768 B1 | 6/2001 | Agarwal et al. | |
| 6,406,453 B1 | 6/2002 | Goode et al. | |
| 6,616,685 B2 | 9/2003 | Rousseau | |
| 7,097,661 B2 | 8/2006 | Perry | |
| 8,192,763 B2 | 6/2012 | Johnson | |
| 8,398,676 B2 | 3/2013 | Roorda et al. | |
| 8,920,516 B2 | 12/2014 | Cook et al. | |
| 8,998,985 B2 | 4/2015 | Gross et al. | |
| 9,011,363 B2 | 4/2015 | Clopp et al. | |
| 9,023,059 B2 | 5/2015 | Loushin et al. | |
| 9,149,295 B1 * | 10/2015 | Condon | A61B 17/1679 |
| 9,186,140 B2 | 11/2015 | Hiles et al. | |
| 9,186,152 B2 | 11/2015 | Campbell et al. | |
| 9,370,448 B2 | 6/2016 | Loushin et al. | |
| 9,763,777 B2 | 9/2017 | Atlas et al. | |
| 9,907,700 B2 | 3/2018 | Clopp et al. | |
| 9,907,701 B2 | 3/2018 | Margulis | |
| 10,285,865 B2 | 5/2019 | Labib et al. | |
| 10,695,168 B2 | 6/2020 | Kozin et al. | |
| 10,786,349 B2 | 9/2020 | Remenschneider et al. | |
| 10,799,341 B2 | 10/2020 | Remenschneider et al. | |
| 10,952,903 B2 | 3/2021 | Margulis | |
| 2006/0063973 A1 | 3/2006 | Makower et al. | |
| 2007/0112380 A1 | 5/2007 | Figulla et al. | |
| 2007/0162119 A1 * | 7/2007 | Johnson | A61F 2/18 |
| | | | 623/901 |
| 2008/0294255 A1 | 11/2008 | Gonzales | |
| 2011/0238094 A1 | 9/2011 | Thomas et al. | |
| 2014/0031852 A1 | 1/2014 | Edgren et al. | |
| 2014/0303727 A1 * | 10/2014 | Atlas | A61F 2/18 |
| | | | 623/10 |
| 2015/0057590 A1 * | 2/2015 | Reilly | A61F 11/202 |
| | | | 604/8 |
| 2016/0030635 A1 | 2/2016 | Bhatia et al. | |
| 2018/0042718 A1 | 2/2018 | Remenschneider et al. | |
| 2018/0116788 A1 | 5/2018 | Kozin et al. | |
| 2018/0236146 A1 | 8/2018 | Carrison et al. | |
| 2019/0224003 A1 | 7/2019 | Remenschneider et al. | |
| 2021/0000590 A1 | 1/2021 | Remenschneider et al. | |
| 2021/0052428 A1 | 2/2021 | Black et al. | |
| 2022/0346945 A1 | 11/2022 | Kozin et al. | |

FOREIGN PATENT DOCUMENTS

| | | | |
|---|---|---|---|
| WO | WO-02067812 A2 * | 9/2002 | A61L 27/3804 |
| WO | 2016154148 A1 | 9/2016 | |
| WO | 2018152065 A1 | 8/2018 | |
| WO | 2020223663 A1 | 11/2020 | |
| WO | 2021119501 A1 | 6/2021 | |
| WO | 2021207572 A1 | 10/2021 | |
| WO | 2022256291 A1 | 12/2022 | |

OTHER PUBLICATIONS

Kozin et al., "Bilayer Graft for Incisionless In-Office Endoscopic Repair of Tympanic Membrane Perforations: A Pilot Study", American Academy of Otolaryngology-Head and Neck Surgery, 2019, pp. 1-3.
1 Australian Examination Report, Application No. 2021253751, dated Sep. 29, 2023.
PCT International Search Report and Written Opinion, Application No. PCT/US2023/011719, dated May 16, 2023.
Cook Medical, "Harvest results, no patient tissue 1, Biodesign Otologic Repair Graft" Brochure, 2018, OHNS-D41415-EN, pp. 1-5.
Cook Medical, "Biodesign Otologic Repair Graft, Harvest results, not patient tissue", Brochure 2020, OHNS-D56536-EN-F, weblink: cookmedical.com/products/.
European Communication pursuant to Rules 161(1) and 162 EPC, Application No. 21721788.4, dated Nov. 17, 2022.
PCT International Search Report and Written Opinion, Application No. PCT/US2021/026524, dated Jul. 8, 2021.

* cited by examiner

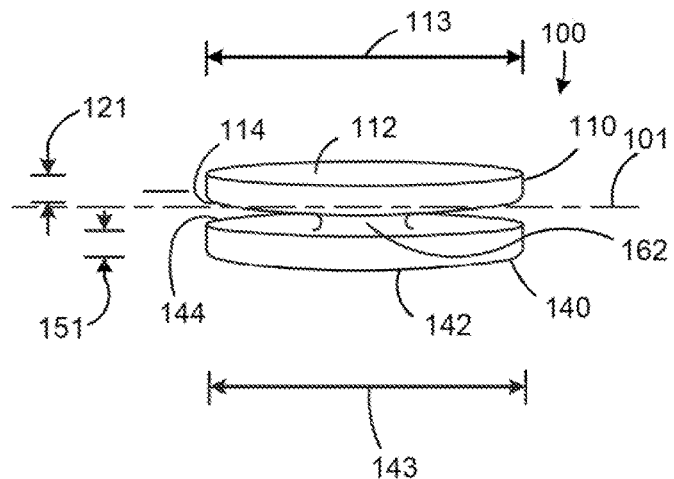
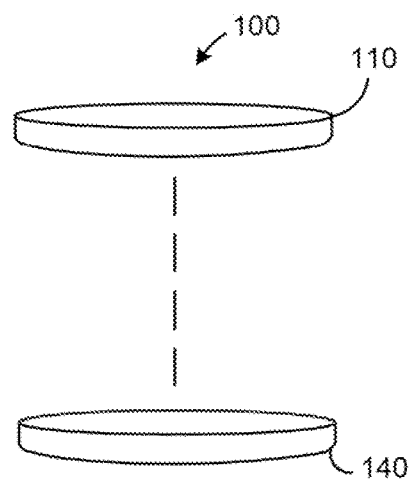
FIG.1    FIG.2
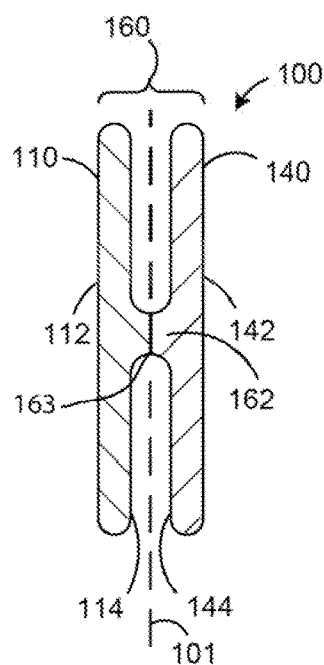
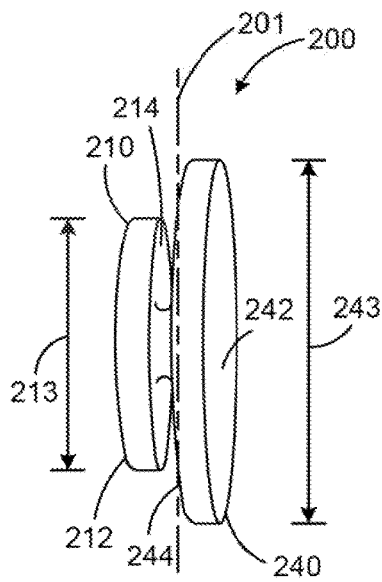
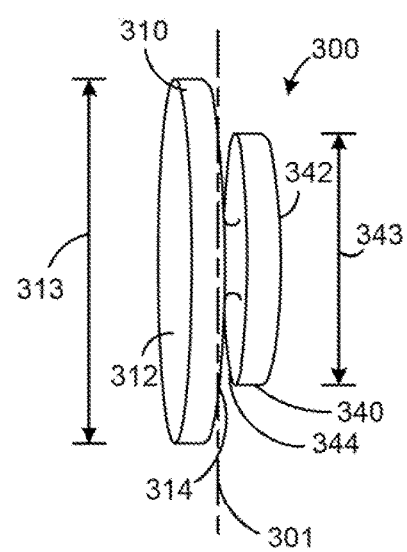
FIG.3    FIG.4    FIG.5

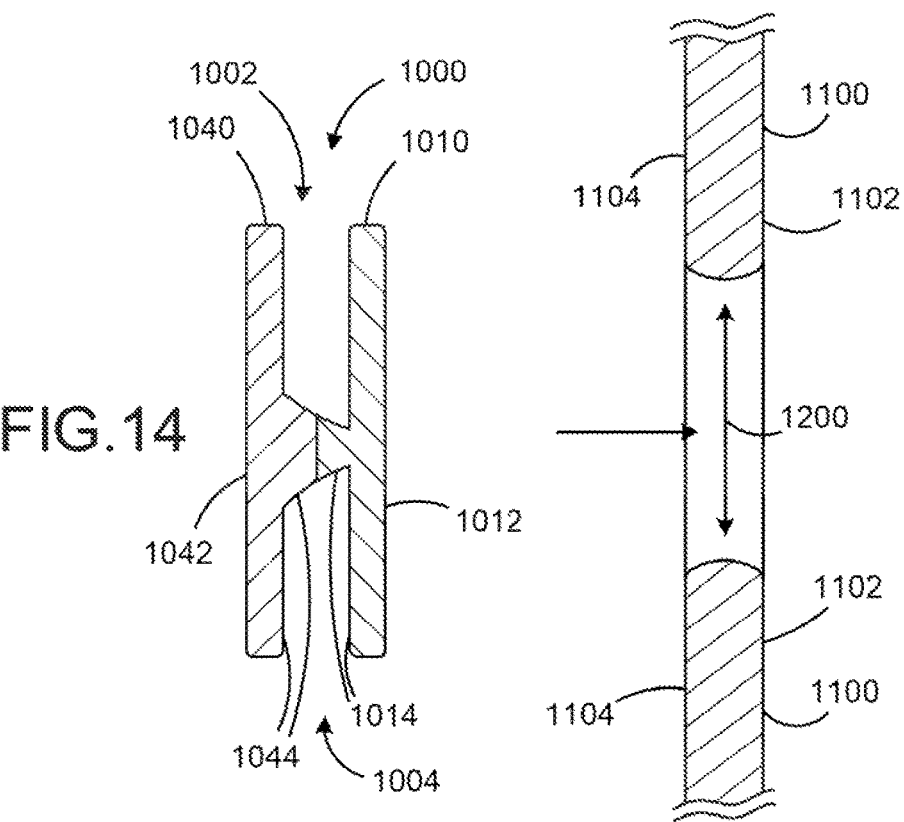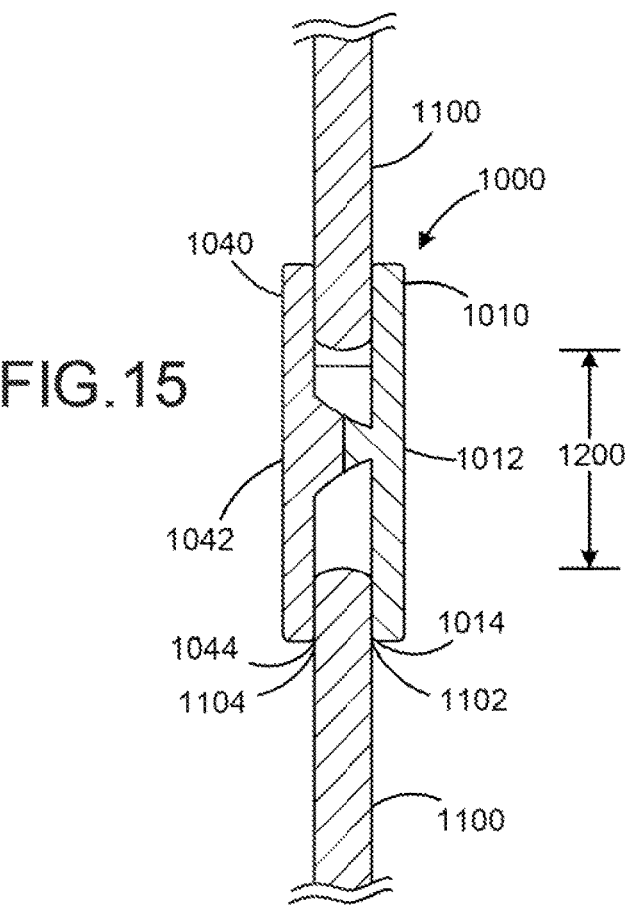

MEDICAL DEVICES FOR REPAIRING PERFORATIONS IN TISSUE, METHODS OF MANUFACTURING MEDICAL DEVICES, AND METHODS OF IMPLANTING A MEDICAL DEVICE

CROSS REFERENCE TO RELATED APPLICATION

This application claims priority to U.S. Provisional Application No. 63/008,111, filed on Apr. 10, 2020. The entire contents of this related application are hereby incorporated by reference into this disclosure.

FIELD

The disclosure relates generally to the field of medical devices, methods of manufacturing medical devices, and methods of implanting a medical device. More particularly, the disclosure relates to medical devices for repairing perforations in tissue, such as the tissue forming the tympanic membrane, methods of manufacturing medical devices, and methods of implanting a medical device.

BACKGROUND

Perforations in tissue can be caused in many ways, such as by trauma or complications during surgery. For example, perforations in the tympanic membrane can lead to hearing loss, infections, and have a long-term impact on a patient's quality of life. Current procedures used to repair perforations in the tympanic membrane are generally accomplished using a gel packing material to secure a repair graft in place while the patient is under general anesthesia. Unfortunately, however, current procedures fail to provide an approach for treating tympanic membrane perforations in patients that are not candidates for general anesthesia and fail to provide physicians with an option for treating these perforations without utilizing the gel-packing material as a support for the repair graft. While some medical devices have been developed to treat perforations in the tympanic membrane, these medical devices lack sufficient structural support to maintain the medical device in place without use of the gel-packing material.

A need exists, therefore, for new and useful medical devices for repairing perforations in tissue, methods of manufacturing medical devices, and methods of implanting a medical device.

SUMMARY OF SELECTED EXAMPLE EMBODIMENTS

Various example medical devices for repairing perforations in tissue, methods of manufacturing medical devices, and methods of implanting a medical device are described herein.

An example of a medical device for repairing perforations in tissue has a lengthwise axis and a first piece of material attached to a second piece of material. The first piece of material has a first surface, a second surface, a first length, and a first thickness. The second piece of material has a third surface, a fourth surface, a second length, and a second thickness. The first piece of material is attached to the second piece of material along a portion of the second surface and along a portion of the fourth surface.

An example method of manufacturing a medical device includes obtaining a first piece of material, obtaining a second piece of material, obtaining a divider that defines a passageway that extends through the divider, positioning the divider between the first piece of material and the second piece of material such that the divider contacts the first piece of material and the second piece of material, forming a contact interface that extends between the first piece of material and the second piece of material to attach the first piece of material to the second piece of material, and removing the divider from between the first piece of material and the second piece of material.

Another example method of manufacturing a medical device includes obtaining a first piece of biocompatible material, obtaining a second piece of biocompatible material, obtaining a divider that defines a passageway that extends through the divider, positioning the divider between the first piece of biocompatible material and the second piece of biocompatible material such that the divider contacts the first piece of biocompatible material and the second piece of biocompatible material, attaching a portion of the first piece of biocompatible material to a portion of the second piece of biocompatible material within the passageway defined by the divider, and removing the divider from between the first piece of biocompatible material and the second piece of biocompatible material. Each of the first piece of biocompatible material and the second piece of biocompatible material is formed of an extracellular matrix material. The divider is formed of a polymeric material.

Another example method of manufacturing a medical device includes obtaining a first piece of biocompatible material, obtaining a second piece of biocompatible material, obtaining a divider that defines a passageway that extends through the divider, positioning the divider between the first piece of biocompatible material and the second piece of biocompatible material such that the divider contacts the first piece of biocompatible material and the second piece of biocompatible material, attaching a portion of the first piece of biocompatible material to a portion of the second piece of biocompatible material within the passageway defined by the divider, and removing the divider from between the first piece of biocompatible material and the second piece of biocompatible material. Each of the first piece of biocompatible material and the second piece of biocompatible material is formed of small intestinal submucosa. The divider is formed of Teflon®.

A method of implanting a medical device to repair a perforation defined by tissue includes obtaining a medical device, applying a force on the medical device directed toward a perforation defined by tissue, implanting the medical device into the perforation such that a first piece of material of the medical device interfaces with and directly contacts a first surface of the tissue defining the perforation and a second piece of material of the medical device interfaces with and directly contacts a second surface of the tissue defining the tissue.

Additional understanding of these examples can be obtained by review of the detailed description, below, and the appended drawings.

BRIEF DESCRIPTION OF THE DRAWINGS

FIG. 1 is a perspective view of an example medical device.

FIG. 2 is an exploded view of the medical device illustrated in FIG. 1 prior to attachment of the first piece of material to the second piece of material.

FIG. 3 is a cross-sectional view of the medical device illustrated in FIG. 1 taken along the lengthwise axis of the medical device.

FIG. 4 is a perspective view of another example medical device.

FIG. 5 is a perspective view of another example medical device.

FIG. 14 is a cross-sectional view of a medical device and tissue prior to implantation of the medical device within a perforation defined by the tissue.

FIG. 15 is a cross-sectional view of a medical device and tissue subsequent to implantation of the medical device within a perforation defined by the tissue.

DETAILED DESCRIPTION OF SELECTED EXAMPLES

Figure 6:
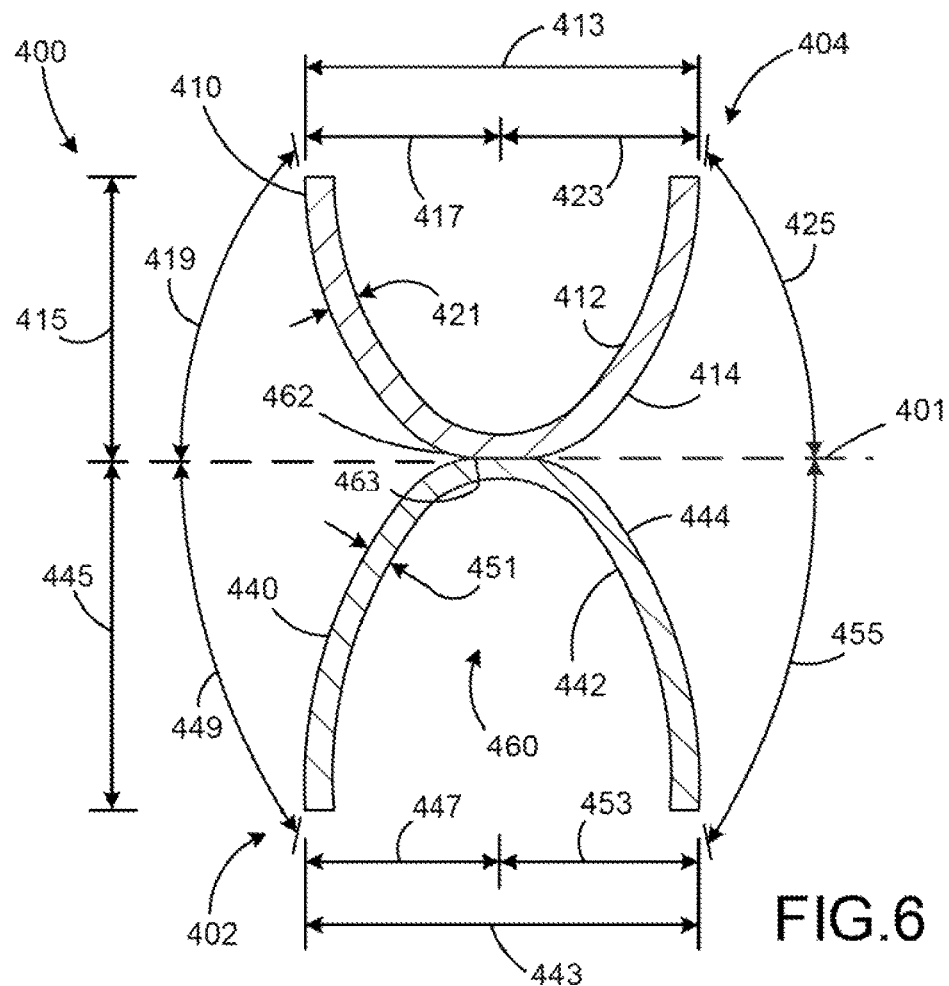
FIG. 6 is a cross-sectional view of another example medical device taken along the lengthwise axis of the medical device.

The following detailed description and the appended drawings describe and illustrate various example embodiments of medical devices for repairing perforations in tissue, such as the tissue forming the tympanic membrane, methods of manufacturing medical devices, and methods of implanting a medical device. The description and illustration of these examples are provided to enable one skilled in the art to make and use a medical device, practice a method of manufacturing medical devices, and/or practice a method of implanting a medical device. They are not intended to limit the scope of the claims in any manner.

As used herein, the term "diameter" refers to the length of a straight line passing through the center of a body, element, or feature from one surface of the body, element, or feature, to another surface of the body, element, or feature and does not impart any structural configuration on the body, element, or feature.

FIGS. 1, 2, and 3 illustrate an example medical device 100. The medical device 100 has a lengthwise axis 101 and a first piece of material 110 attached to a second piece of material 140 at a location of attachment 162. The first piece of material 110 has a first surface 112, a second surface 114, a first length 113, and a first thickness 121 measured from the first surface 112 to the second surface 114. The second piece of material 140 has a third surface 142, a fourth surface 144, a second length 143, and a second thickness 151 measured from the third surface 142 to the fourth surface 144. Prior to attachment of the first piece of material 110 to the second piece of material 140, the first surface 112 and the second surface 114 are substantially parallel to each other and opposably facing one another. Prior to attachment of the second piece of material 140 to the first piece of material 100, the third surface 142 and the fourth surface 144 are substantially parallel to each other and opposably facing one another. The first piece of material 110 is formed of a first material and the second piece of material 140 is formed of a second material. In the illustrated embodiment, the first material and the second material are the same. The first piece of material 110 and the second piece of material 140 are attached to each other along a portion of the second surface 114 and along a portion of the fourth surface 144, as described in more detail below. In the illustrated embodiment, the first length 113 and the second length 143 are equal to each other, the first thickness 121 and the second thickness 151 are equal to each other, and each of the first piece of material 110 and the second piece of material 140 defines a cylindrical shape.

The structural configuration of the first piece of material 110 and the second piece of material 140 when attached to one another defines dual flanges 160 that provide a mechanism for maintaining the position of the medical device 100 in a perforation defined by tissue, such as the tympanic membrane. This structural arrangement allows for each of the first piece of material 110 and the second piece of material 140 to interact with and directly contact a surface on each side of the tissue when implanted within a perforation defined by the tissue such that the medical device 100 spans the perforation and is secured in place.

In the illustrated embodiment, the location of attachment 162 between the first piece of material 110 and the second piece of material 140 is centrally located (e.g., in the center of each of the first and second pieces of material 110, 140) and concentrically aligns the first piece of material 110 and the second piece of material 140 relative to one another. This structural arrangement allows for implantation of the device such that the location of attachment 162 is positioned within the perforation defined by the tissue (e.g., disposed at an angle relative to a lengthwise axis of the perforation, parallel to a lengthwise axis of the perforation, coaxial with a lengthwise axis of the perforation, substantially coaxial with a lengthwise axis of the perforation, perpendicular to a lengthwise axis of the perforation). A contact interface 163 is disposed at the location of attachment 162, comprises an attachment between the first and second pieces of material 110, 140 (e.g., lamination joint), and extends between the first piece of material 110 and the second piece of material 140 such that a portion of the first piece of material 110 and/or the second piece of material 140 is disposed between the two pieces of material 110, 140 when the medical device 100 is disposed within a perforation defined by tissue, as described herein, or when a divider is disposed between the two pieces of material 110, 140, as described herein. A contact interface included in a medical device can have any suitable structural arrangement and selection of a suitable structural arrangement can be based on various considerations, such as the intended use of the medical device. For example, a contact interface can have any suitable length and diameter. Diameters measured on an axis that is parallel to a lengthwise axis of a medical device considered suitable for a contact interface include diameters equal to, less than, or greater than 1 millimeter, 2 millimeters, 3 millimeters, 4 millimeters, 5 millimeters, diameters between about 1 millimeter and about 5 millimeters, and any other diameter considered suitable for a particular embodiment.

While the first length 113 of the first piece of material 110 and the second length 143 of the second piece of material 140 have been illustrated as being equal to each other, a first length of a first piece of material and a second length of a second piece of material can define any suitable length relative to each other. Selection of a suitable first length and a suitable second length can be based on various considerations, including the size, shape, and configuration of a perforation defined by tissue. Examples of lengths considered suitable for a first length and a second length include first lengths that are equal to, greater than, or less than second lengths, lengths that are equal to, greater than, or less than 3 millimeters, 4 millimeters, 5 millimeters, 6 millimeters, lengths between about 3 millimeters and about 6 millimeters, and any other lengths considered suitable for a particular embodiment.

While the first thickness 121 of the first piece of material 110 and the second thickness 151 of the second piece of material 140 have been illustrated as being equal to each other, a first thickness of a first piece of material and a second thickness of a second piece of material can define any suitable thickness relative to each other. Selection of a suitable first thickness and a suitable second thickness can be based on various considerations, including the thickness of tissue defining a perforation. Examples of suitable thicknesses include first thicknesses that are equal to, greater than, or less than second thicknesses, and any other thicknesses considered suitable for a particular embodiment.

While each of the first piece of material 110 and the second piece of material 140 have been illustrated as defining a cylindrical shape, a first piece of material and a second piece of material can define any suitable shape. Selection of a suitable shape for a first piece of material and a second piece of material can be based on various considerations, including the shape, size, and configuration of a perforation defined by tissue. Examples of suitable cross-sectional shapes for a first piece of material and a second piece of material include circular, ovoid, elliptical, triangular, rectangular, square, and any other shapes considered suitable for a particular embodiment. Examples of suitable shapes for a first piece of material and a second piece of material include shapes that are spherical, cylindrical, conical, cuboidal, triangular prisms, hexagonal prisms, octagonal prisms, and any other shapes considered suitable for a particular embodiment.

While the first piece of material 110 has been illustrated as having a first surface 112 and a second surface 114 that are substantially parallel to each other and the second piece of material 140 has been illustrated as having a third surface 142 and a fourth surface 144 that are substantially parallel to each other prior to attachment of the first piece of material 110 to the second piece of material 140, other structural arrangements are considered suitable. Selection of a suitable structural arrangement for the surfaces of a piece of material can be based on various considerations, including the intended use of the medical device of which the pieces of material are included. Examples of suitable structural arrangements between surfaces of a piece of material included in a medical device include those in which a first surface and a second surface of a piece of material, prior to attachment to another piece of material, or subsequent to attachment to another piece of material, are substantially parallel, diverge relative to one another, converge relative to one another, are curved, and any other structural arrangement considered suitable for a particular embodiment.

While the location of attachment 162 between the first piece of material 110 and the second piece of material 140 has been illustrated as centrally located, a location of attachment between a first piece of material 110 and a second piece of material 140 can be positioned at any suitable location relative to first and second pieces of material. Selection of a suitable location to position a location of attachment between first and second pieces of material can be based on various considerations, including the intended use of the medical device of which the pieces of material are included. Examples of suitable locations considered suitable to position a location of attachment between first and second pieces of material include those in which the location of attachment is centrally located, offset relative to the center of a first piece of material, offset relative to a center of a second piece of material, offset relative to both a first piece of material and a second piece of material, and any other location considered suitable for a particular embodiment.

While the medical device 100 has been illustrated as including a first piece of material 110 formed of a first material and a second piece of material 140 formed of a second material that is the same as the first material, a first piece of material and a second piece of material can be formed of any suitable material. Selection of a suitable material for a first material and a second material can be based on various considerations, including the type of attachment formed between pieces of material, between a medical device and a perforation defined by tissue, the shape of a perforation defined by tissue, and other considerations. Examples of materials considered suitable to form a first piece of material and a second piece of material include biocompatible materials, natural materials, allogenic materials, xenogeneic materials, synthetic materials, and combinations of natural and synthetic materials. Examples of suitable natural materials include extracellular matrix (ECM) materials, such as small intestine submucosa (SIS), and other bioremodelable materials, such as bovine pericardium. Other examples of suitable ECM materials that can be used include stomach submucosa, liver basement membrane, urinary bladder submucosa, tissue mucosa, and dura mater. Other examples of suitable natural materials include renal capsule matrix, abdominal fascia, parenchyma, such as abdominal parenchyma, connective tissue, pulmonary or lung ligament, tissue laminates, and natural valve leaflets with or without adjacent vessel wall. Pleura is also considered a suitable natural material, including visceral pleura. Examples of suitable synthetic materials include polymeric materials, such as expanded polytetrafluoroethylene, polyurethane, polyurethane urea, polycarbonate, and polyesters.

A first material forming a first piece of material can be the same as, or different than, a second material forming a second piece of material.

FIG. 4 illustrates another example medical device 200 that has a lengthwise axis 201 and a first piece of material 210 attached to a second piece of material 240. The medical device 200 is similar to the medical device 100 illustrated in FIGS. 1 through 3 and described above, except as detailed below. The first piece of material 210 has a first surface 212, a second surface 214, and a first length 213. The second piece of material 240 has a third surface 242, a fourth surface 244, and a second length 243. As illustrated in FIG. 4, the second length 243 is greater than the first length 213. The difference in lengths between the first piece of material 210 and the second piece of material 240 allows for a medical device to be inserted into and secure within an asymmetrical perforation defined by tissue (e.g., tympanic membrane) and/or provides a mechanism to increase contact between the fourth surface 244 of the second piece of material 240 and tissue defining a perforation.

FIG. 5 illustrates another example medical device 300 that has a lengthwise axis 301 and a first piece of material 310 attached to a second piece of material 340. The medical device 300 is similar to the medical device 100 illustrated in FIGS. 1 through 3 and described above, except as detailed below. The first piece of material 310 has a first surface 312, a second surface 314, and a first length 313. The second piece of material 340 has a third surface 342, a fourth surface 344, and a second length 343. As illustrated in FIG. 5, the first length 313 is greater than the second length 343. The difference in lengths between the first piece of material 310 and the second piece of material 340 allows for a medical device to be inserted into and secure within an asymmetrical perforation defined by tissue (e.g., tympanic membrane) and/or provides a mechanism to increase contact between the second surface 314 of the first piece of material 310 and tissue defining a perforation.

FIG. 6 illustrates another example medical device 400 that has a first end 402, a second end 404, a lengthwise axis 401 that extends between the first end 402 to the second end 404, and a first piece of material 410 attached to a second piece of material 440. The medical device 400 is similar to the medical device 100 illustrated in FIGS. 1 through 3 and described above, except as detailed below. The first piece of material 410 has a first surface 412, a second surface 414, a first length 413, a first height 415, a first portion 417 disposed at a first angle 419 relative to the lengthwise axis 401, a second portion 423 disposed at a second angle 425 relative to the lengthwise axis 401, and a first thickness 421 measured from the first surface 412 to the second surface 414. The second piece of material 440 has a third surface 442, a fourth surface 444, a second length 443, a second height 445, a third portion 447 disposed at a third angle 449 relative to the lengthwise axis 401, a fourth portion 453 disposed at a fourth angle 455 relative to the lengthwise axis 401, and a second thickness 451 measured from the third surface 442 to the fourth surface 444. The first piece of material 410 and the second piece of material 440 are attached at a location of attachment 462 along the second surface 414 and the fourth surface 444. A contact interface 463 is disposed at the location of attachment 462, comprises an attachment between the first and second pieces of material 410, 440, and extends between the first piece of material 410 and the second piece of material 440.

In the illustrated embodiment, the first portion 417 extends from the location of attachment 462 to an outer edge of the first piece of material 410. The second portion 423 extends from the location of attachment 462 to an outer edge of the first piece of material 410. The third portion 447 extends from the location of attachment 462 to an outer edge of the second piece of material 440. The fourth portion 453 extends from the location of attachment 462 to an outer edge of the second piece of material 440. The first portion 417 extends in a first direction away from the lengthwise axis 401 and the third portion 447 extends in a second direction away from the lengthwise axis 401 that is different and substantially opposite to the first direction. The second portion 423 extends in a third direction away from the lengthwise axis 401 and the fourth portion 453 extends in a fourth direction away from the lengthwise axis 401 that is different and substantially opposite to the third direction. The outer edge of the first piece of material 410 is disposed at the second end 404 and the outer edge of the second piece of material 440 is disposed at the first end 402. The first portion 417 and the second portion 423 extend away from the lengthwise axis 401 a first height 415. The third portion 447 and the fourth portion 453 extend away from the lengthwise axis 401 a second height 445. In the illustrated embodiment, the first height 415 is equal to the second height 445, the first and second angles 419, 425 are equal to one another, and the third angle 449 and the fourth angle 455 are equal to one another. In the illustrated embodiment, the first length 413 and the second length 443 are equal to each other and the first thickness 421 and the second thickness 451 are equal to each other. In the illustrated embodiment, the first piece of material 410 and the second piece of material 440 are each biased to configurations in which each piece of material extends from the location of attachment 462 and away from the lengthwise axis 401 of the medical device 400 to an outer edge of the piece of material (e.g., the first piece of material is biased to a convex configuration relative to the lengthwise axis 401, the second piece of material is biased to a convex configuration relative to the lengthwise axis 401). Such bias can be imparted into the medical device 400 prior to, subsequent to, or during manufacture of the pieces of material (e.g., using a divider, as described below, that defines a structural arrangement that defines the structural arrangement intended to be imparted on a piece, or pieces, of material).

The structural configuration of the medical device 400 provides an angled, dual flange 460 structural arrangement that allows the second surface 414 of the first piece of material 410 to interface with and directly contact the tissue defining a perforation such that the medical device 400 can be implanted as desired. The medical device 400 also provides a structural arrangement that allows the fourth surface 444 of the second piece of material 440 to interface with and directly contact the tissue defining a perforation such that the medical device 400 can be implanted as desired.

While the first height 415 of the first piece of material 410 and the second height 445 of the second piece of material 440 have been illustrated as being equal to each other, a first height of a first piece of material and a second height of a second piece of material can define any suitable height relative to each other. Selection of a suitable first height and a suitable second height can be based on various considerations, including the size, shape, and configuration of a perforation in tissue. Examples of suitable first heights and second heights include a first height that is equal to a second height, a first height that is greater than a second height, a first height that is less than a second height, and any other heights considered suitable for a particular embodiment.

While the first angle 419 of the first portion 417 and the second angle 425 of the second portion 423 have been illustrated as being equal to one another, a first angle of a first portion and a second angle of a second portion can define any suitable angle relative to each other. Selection of a suitable first angle and a suitable second angle can be based on various considerations, including the size, shape, and configuration of a perforation in tissue. Examples of suitable first angles and second angles include a first angle that is equal to a second angle, a first angle that is greater than a second angle, a first angle that is less than a second angle, and any other angles considered suitable for a particular embodiment.

While the third angle 449 of the third portion 447 and the fourth angle 455 of the fourth portion 453 have been illustrated as being equal to one another, a third angle of a third portion and a fourth angle of a fourth portion can define any suitable angle relative to each other. Selection of a suitable third angle and a suitable fourth angle can be based on various considerations, including the size, shape, and configuration of a perforation in tissue. Examples of suitable third angles and fourth angles include a third angle that is equal to a fourth angle, a third angle that is greater than a fourth angle, a third angle that is less than a fourth angle, and any other angles considered suitable for a particular embodiment.

Figure 7:
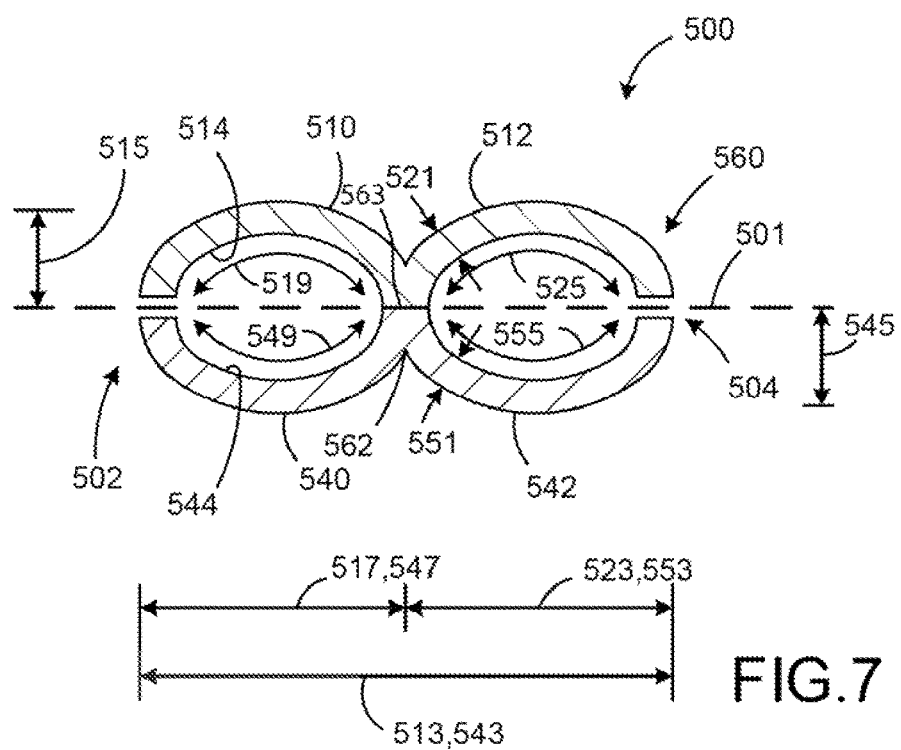
FIG. 7 is a cross-sectional view of another example medical device taken along the lengthwise axis of the medical device.

FIG. 7 illustrates another example medical device 500 that has a first end 502, a second end 504, a lengthwise axis 501 that extends from the first end 502 to the second end 504, and a first piece of material 510 attached to a second piece of material 540. The medical device 500 is similar to the medical device 100 illustrated in FIGS. 1 through 3 and described above, except as detailed below. The first piece of material 510 has a first surface 512, a second surface 514, a first length 513, a first height 515, a first portion 517 disposed at a first angle 519 relative to the lengthwise axis 501, a second portion 523 disposed at a second angle 525 relative to the lengthwise axis 501, and a first thickness 521 measured from the first surface 512 to the second surface 514. The second piece of material 540 has a third surface 542, a fourth surface 544, a second length 543, a second height 545, a third portion 547 disposed at a third angle 549 relative to the lengthwise axis 501, a fourth portion 553 disposed at a fourth angle 555 relative to the lengthwise axis 501, and a second thickness 551 measured from the third surface 542 to the fourth surface 544. The first piece of material 510 and the second piece of material 540 are attached at a location of attachment 562. A contact interface 563 is disposed at the location of attachment 562, comprises an attachment between the first and second pieces of material 510, 540, and extends between the first piece of material 510 and the second piece of material 540.

In the illustrated embodiment, the first portion 517 extends from the first end 502 to the location of attachment 562. The second portion 523 extends from the second end 504 to the location of attachment 562. The third portion 547 extends from the first end 502 to the location of attachment 562. The fourth portion 553 extends from the second end 504 to the location of attachment 562. The third portion 547 opposably faces the first portion 517 relative to the lengthwise axis 501 and the fourth portion 553 opposably faces the second portion 523 relative to the lengthwise axis 501. The first height 515 is equal to the second height 545. In the illustrated embodiment, the first angle 519 and the second angle 525 are equal to one another and the third angle 549 and the fourth angle 555 are equal to one another. In the illustrated embodiment, the first length 513 and the second length 543 are equal to each other and the first thickness 521 and the second thickness 551 are equal to each other. In the illustrated embodiment, the first piece of material 510 and the second piece of material 540 are each biased to configurations in which each piece of material extends from the location of attachment 562 away from the lengthwise axis 501 of the medical device 500 to a location between an end (e.g., first end 502, second end 504) and from the location between the end and towards the lengthwise axis 501 of the medical device 500 (e.g., the first piece of material is biased to a concave configuration relative to the lengthwise axis 501, the second piece of material is biased to a concave configuration relative to the lengthwise axis 501). Such bias can be imparted into the medical device 500 prior to, subsequent to, or during manufacture of the pieces of material (e.g., using a divider, as described below, that defines a structural arrangement that defines the structural arrangement intended to be imparted on a piece, or pieces, of material).

The structural configuration of medical device 500 provides an angled, dual flange 560 structural arrangement that allows the second surface 514 of the first piece of material 510 to interface with and directly contact the tissue defining a perforation such that the medical device 500 can be implanted as desired. The medical device 500 also provides a structural arrangement that allows the fourth surface 544 of the second piece of material 540 to interface with and directly contact the tissue defining a perforation such that the medical device 500 can be implanted as desired.

While the first height 515 of the first piece of material 510 and the second height 545 of the second piece of material 540 have been illustrated as being equal to each other, a first height of a first piece of material and a second height of a second piece of material can define any suitable height relative to each other. Selection of a suitable first height and a suitable second height can be based on various considerations, including the size, shape, and configuration of a perforation of a tympanic membrane. Examples of suitable first heights and second heights include a first height that is equal to a second height, a first height that is greater than a second height, a first height that is less than a second height, and any other heights considered suitable for a particular embodiment.

While the first angle 519 of the first portion 517 and the second angle 525 of the second portion 523 have been illustrated as being equal to one another, a first angle of a first portion and a second angle of a second portion can define any suitable angle relative to each other. Selection of a suitable first angle and a suitable second angle can be based on various considerations, including the size, shape, and configuration of a perforation of a tympanic membrane. Examples of suitable first angles and second angles include a first angle that is equal to a second angle, a first angle that is greater than a second angle, a first angle that is less than a second angle, and any other angles considered suitable for a particular embodiment.

While the third angle 549 of the third portion 547 and the fourth angle 555 of the fourth portion 553 have been illustrated as being equal to one another, a third angle of a third portion and a fourth angle of a fourth portion can define any suitable angle relative to each other. Selection of a suitable third angle and a suitable fourth angle can be based on various considerations, including the size, shape, and configuration of a perforation in tissue. Examples of suitable third angles and fourth angles include a third angle that is equal to a fourth angle, a third angle that is greater than a fourth angle, a third angle that is less than a fourth angle, and any other angles considered suitable for a particular embodiment.

Figure 8:
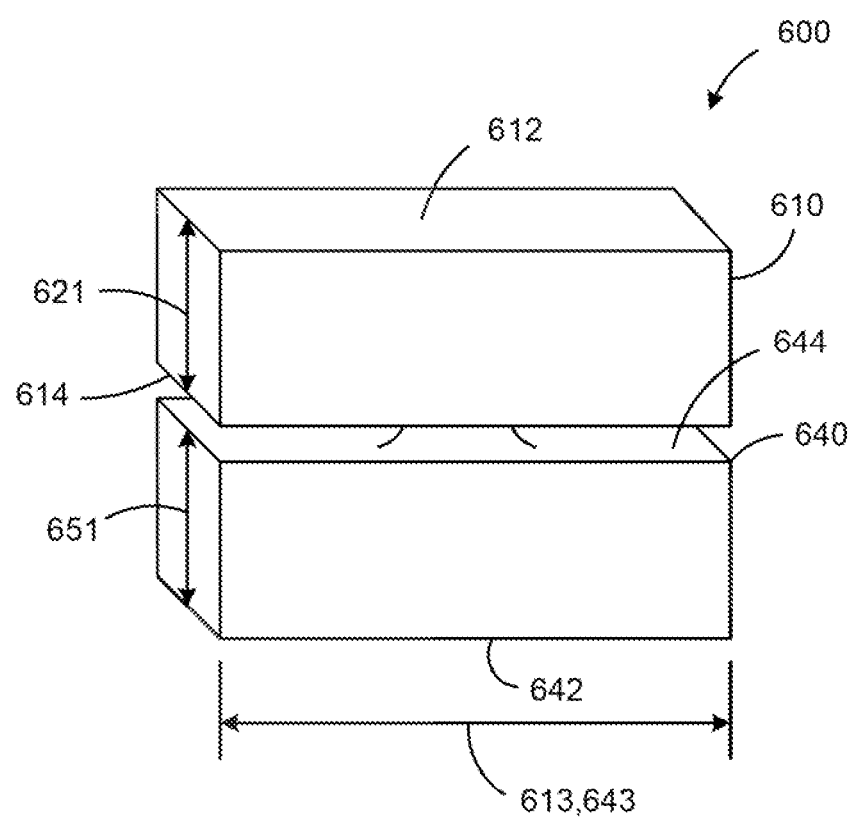
FIG. 8 is a perspective view of another example medical device.

FIG. 8 illustrates another example medical device 600 that has a first piece of material 610 attached to a second piece of material 640. The medical device 600 is similar to the medical device 100 illustrated in FIGS. 1 through 3 and described above, except as detailed below. The first piece of material 610 defines a first surface 612, a second surface 614, a first length 613, and a first thickness 621 measured from the first surface 612 to the second surface 614. The second piece of material 640 defines a third surface 642, a fourth surface 644, a second length 643, and a second thickness 651 measured from the third surface 642 to the fourth surface 644. The first length 613 and the second length 643 are equal to each other and the first thickness 621 and the second thickness 651 are equal to each other. In the illustrated embodiment, each of the first piece of material 610 and the second piece of material 640 defines a cuboidal shape. The cuboidal shape of each of the first piece of material 610 and the second piece of material 640 allows for the medical device to be inserted into and secured to a perforation defined by tissue that has an elongated shape.

Various methods of manufacturing a medical device and methods of repairing a perforation defined by tissue are described herein. While the methods described herein are shown and described as a series of acts, it is to be understood and appreciated that the methods are not limited by the order of acts, as some acts may in accordance with these methods, occur in the order shown and/or described, in different orders, and/or concurrently with other acts described herein.

Figure 9:
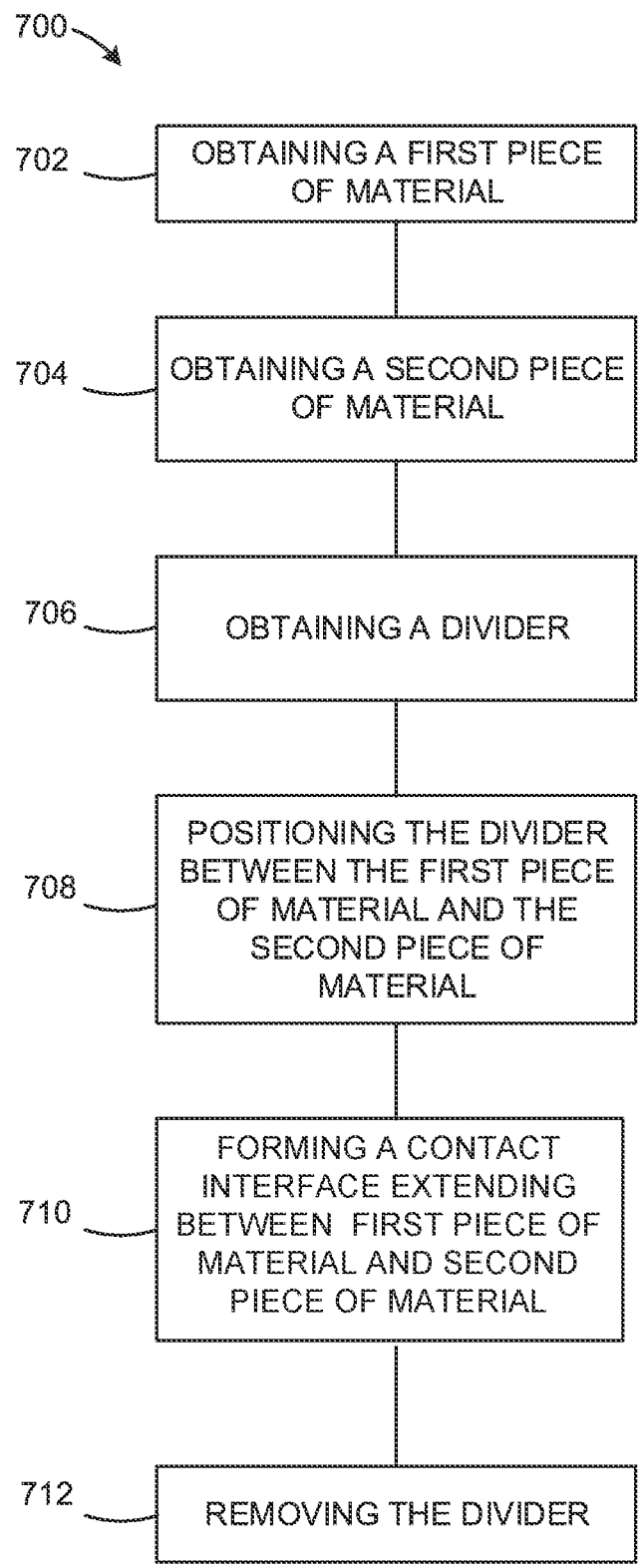
FIG. 9 is a schematic illustration of an example method of manufacturing a medical device.

FIG. 9 illustrates a schematic illustration of an example method 700 of manufacturing a medical device.

An initial step 702 comprises obtaining a first piece of material. Another step 704 comprises obtaining a second piece of material. Another step 706 comprises obtaining a divider that defines a passageway that extends through the divider. Another step 708 comprises positioning the divider between each of the first piece of material and the second piece of material such that the divider contacts the first piece of material and the second piece of material. Another step 710 comprises forming a contact interface that extends between the first piece of material and the second piece of material to attach the first piece of material to the second piece of material. Another step 712 comprises removing the divider from between the first piece of material and the second piece of material.

Figure 10:
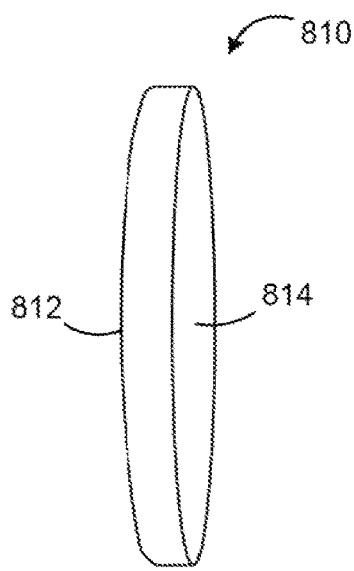
FIG. 10 is a perspective view of a first piece of material used in the method illustrated in FIG. 9.

Step 702 can be accomplished using any first piece of material considered suitable for a particular embodiment. For example, FIG. 10 illustrates a first piece of material 810 that is similar to the first piece of material 110 illustrated in FIGS. 1 through 3. The first piece of material 810 has a first surface 812 and a second surface 814. Examples of first pieces of material considered suitable to complete step 702 include first piece of material 110, first piece of material 210, first piece of material 310, first piece of material 410, first piece of material 510, first piece of material 610, first piece of material 810, first piece of material 1010, first piece of material 1410, first piece of material 1510, first piece of material 1610, first piece of material 1710, first piece of material 1810, variations of the first pieces of material described herein, and any other pieces of material considered suitable for a particular embodiment.

Figure 12:
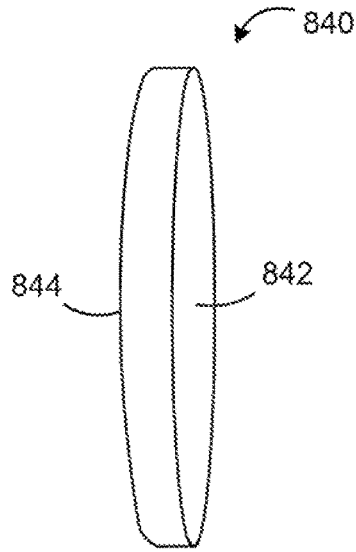
FIG. 12 is a perspective view of a second piece of material used in the method illustrated in FIG. 9.

Step 704 can be accomplished using any second piece of material considered suitable for a particular embodiment. For example, FIG. 12 illustrates a second piece of material 840 that is similar to the second piece of material 140 illustrated in FIGS. 1 through 3. The second piece of material 840 has a third surface 842 and a fourth surface 844. Examples of second pieces of material considered suitable to complete step 704 include second piece of material 140, second piece of material 240, second piece of material 340, second piece of material 440, second piece of material 540, second piece of material 610, second piece of material 840, second piece of material 1040, second piece of material 1440, second piece of material 1540, second piece of material 1640, second piece of material 1740, second piece of material 1840, variations of the second pieces of material described herein, and any other pieces of material considered suitable for a particular embodiment.

Figure 11:
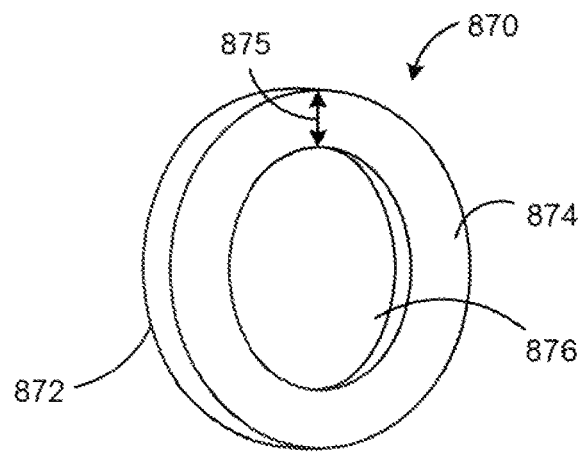
FIG. 11 is a perspective view of a divider used in the method illustrated in FIG. 9.
Figure 23:
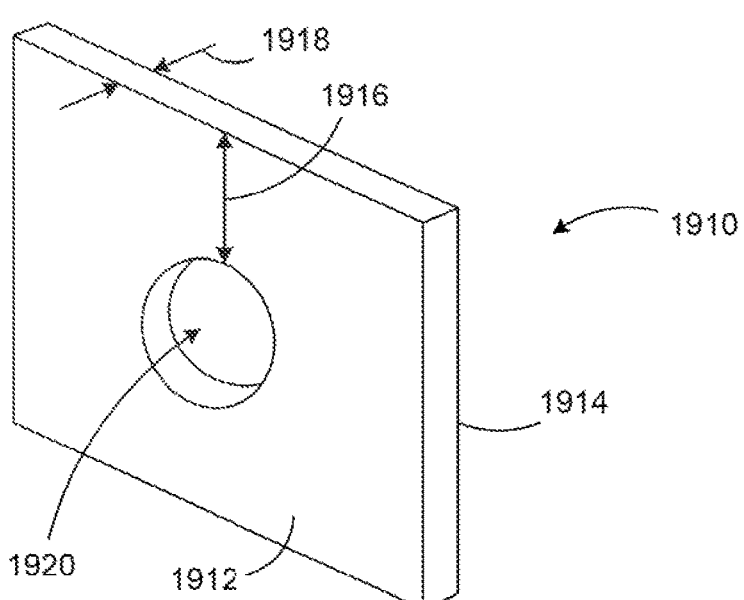
FIG. 23 is a perspective view of another divider that can be used to manufacture a medical device.

Step 706 can be accomplished using any divider considered suitable for a particular embodiment, such as divider 870 illustrated in FIG. 11, divider 1910 illustrated in FIG. 23, or any other divider considered suitable for a particular embodiment. For example, FIG. 11 illustrates a divider 870 that has a fifth surface 872, a sixth surface 874, and defines a width 875 and a passageway 876 that extends entirely through the divider 870 from the fifth surface 872 to the sixth surface 874. The fifth surface 872 is substantially parallel to the sixth surface 874 and the sixth surface 874 opposably faces the fifth surface 872. The width 875 extends from the passageway 876 to the outer edge of the divider 870. In the illustrated embodiment, the width 875 is equal to between about 1 millimeter and about 2 millimeters. However, a divider can have any suitable width. The divider 870 defines a shape that is similar to that of the first piece of material 810 and the second piece of material 840 (e.g., the divider has the same shape along its outer surface). In the illustrated embodiment, the divider 870 is cylindrical. Examples of dividers considered suitable to complete step 706 include divider 870, variations of the dividers described herein, and any other dividers considered suitable for a particular embodiment.

While the divider 870 has been illustrated as defining a single passageway 876 that extends from the fifth surface 872 to the sixth surface 874, a divider may include any suitable number of passageways that extends from a fifth surface to a sixth surface. Selection of a suitable number of passageways to include in a divider can be based on various considerations, including the shape, size, and configuration of a first piece of material and a second piece of material, the width of each divider, and other considerations. Examples of suitable numbers of passageways to include in a divider include one, at least one, two, a plurality, three, four, five, six, and any other number considered suitable for a particular embodiment.

While the divider 870 has been illustrated as being cylindrical, a divider can define any suitable shape. Selection of a suitable shape for a divider can be based on various consideration, including the shape of a first piece of material and/or a second piece of material. Examples of suitable cross-sectional shapes for a divider include circular, ovoid, elliptical, triangular, rectangular, square, cross-sectional shapes that are the same as a first piece of material and/or a second piece of material, and any other cross-sectional shapes considered suitable for a particular embodiment. Examples of suitable shapes for divider include shapes that are spherical, cylindrical, conical, cuboidal, triangular prisms, hexagonal prisms, octagonal prisms, shapes that are the same as a first piece of material and/or a second piece of material, and any other shapes considered suitable for a particular embodiment.

Step 708 can be accomplished by positioning the divider between the first piece of material and the second piece of material such that the fifth surface 872 of the divider directly contacts the second surface 814 of the first piece of material and the sixth surface 874 of the divider contacts the fourth surface 844 of the second piece of material 840. Optionally, each of the first piece of material and the second piece of material can be in a wet stage of processing prior to the divider being positioned between and contacting each of the first piece of material and second piece of material. Optionally, step 708 can be repeated if more than one medical device is being manufactured and the pieces of material are sized and configured to allow multiple dividers to be positioned between the pieces of material.

Figure 12A:
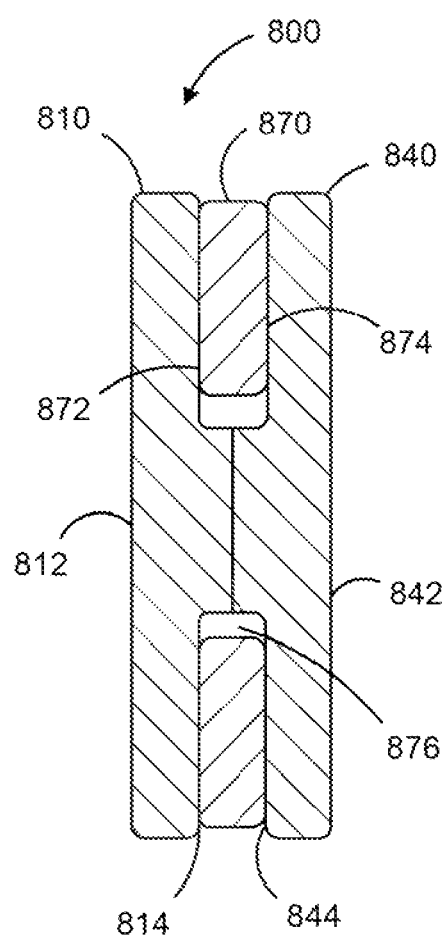
FIG. 12A is a cross-sectional view of the first piece of material illustrated in FIG. 10 attached to the second piece of material illustrated in FIG. 12 within the passageway defined by the divider illustrated in FIG. 11.
Figure 13:
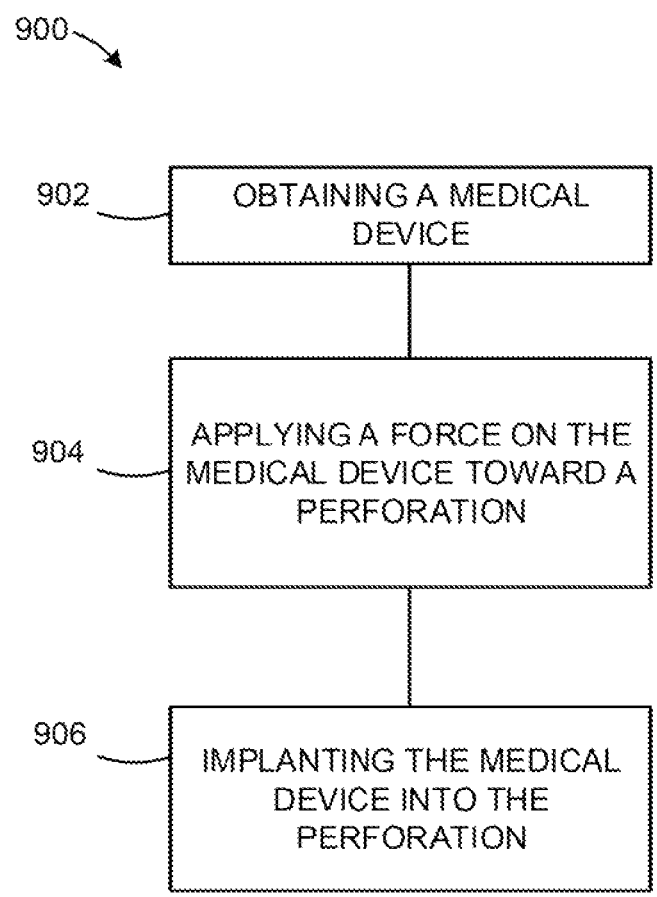
FIG. 13 is a schematic illustration of an example method of implanting a medical device into a perforation defined by tissue.

Step 710 can be accomplished using any technique or method considered suitable to form a contact interface that extends between first and second pieces of material to attach the first piece of material to the second piece of material. The contact interface can be disposed within the passageway defined by the divider and/or outward from a periphery of the divider (e.g., outward from an outer edge of a divider). Step 710 can be accomplished by applying a force on one, or both, of the first piece of material and second piece of material such that they contact one another within a passageway defined by a divider, or outward from an edge of a divider, and allowing the first and second pieces of material to move from a wet state to a dry state to accomplish attachment. Alternatively, step 710 can be accomplished by applying a force (e.g., vacuum) on each of the first piece of material, the second piece of material, and the divider simultaneously such that the first piece of material contacts and becomes attached to the second piece of material within the passageway defined by the divider, as shown in FIG. 12A, to create a medical device 800. The force applied on each of the first piece of material, the second piece of material, and the divider simultaneously allows a portion of the first piece of material (e.g., a portion of the second surface 814) and a portion of the second piece of material (e.g., a portion of the fourth surface 844) to transition from a first position to a second position relative to the passageway of the divider, or relative to a location outward from an outer edge of the divider. In the first position, the first piece of material does not contact the second piece of material and each of the second surface and the fourth surface is positioned outside of the passageway of the divider. As the first piece of material (e.g., second surface 814) and the second piece of material (e.g., fourth surface 844) transition from the first position to the second position, the portion of each of the first piece of material (e.g., the portion of the second surface 814) and the portion of the second piece of material (e.g., the portion of the fourth surface 844) move toward one another and into the passageway of the divider, or toward one another outward from an outer edge of the divider. In the second position, the portion of the first piece of material (e.g., the portion of the second surface 814) is disposed within the passageway defined by the divider and the portion of the second piece of material (e.g., the portion of the fourth surface 844) is disposed within the passageway defined by the divider such that each of the first piece of material and the second piece of material directly contact one another (e.g., the second surface 814 and the fourth surface 844 directly contact one another) within the passageway defined by the divider. Alternatively, in the second position, the portion of the first piece of material (e.g., the portion of the second surface 814) and the portion of the second piece of material (e.g., the portion of the fourth surface 844) directly contact one another (e.g., the second surface 814 and the fourth surface 844 directly contact one another) outward from an outer edge of the divider. In addition, in the second position, a second portion of the first piece of material and a second portion of the second piece of material are disposed outside of the passageway defined by the divider and directly contact the divider. The force applied to accomplished step 710 can be any suitable force. For example, a vacuum can be applied on each of the first piece of material, the second piece of material, and the divider simultaneously until the first piece of material contacts and becomes attached to the second piece of material. If a vacuuming process is used to accomplish step 710, the vacuuming process can utilize a vacuum press fixture that includes a flat silicone bladder and a flat press tool. Each of the first piece of material, the second piece of material, and the divider is placed within the flat press tool and closed so that the flat silicone bladder lays on top of each of the assembled device (e.g., first piece of material or the second piece of material depending on how the device is oriented). Once placement is complete, a vacuum is applied on the closed system (e.g., the first piece of material, the second piece of material, and the divider simultaneously) such that the vacuum compresses the flat silicone bladder onto the device to join the first piece of material and the second piece of material to forma contact interface (e.g., at the location of attachment, adjacent to the divider, disposed along the thickness of the divider). The vacuum can be maintained (e.g., one or more seconds, minutes, and/or hours) until the first piece of material and the second piece of material are dry (e.g., move from a wet state to a dry state) and attachment between the first and second pieces of material has been accomplished. Optionally, the application of a force can be omitted and/or the attachment between the first piece of material and the second piece of material can be accomplished prior to, concurrently with, or subsequent to the first piece of material and/or the second piece of material moving from a wet state to a dry state. Optionally, step 710 can be repeated if more than one than one medical device is being manufactured. Alternatively, contact between first and second pieces of material within a passageway defined by a divider can be accomplished by placing a first piece of material on a surface, placing a divider on the first piece of material, placing a second piece of material over the divider, and then advancing the first and second pieces of material toward one another until they contact one another (e.g., are compressed against one another) and can be attached, as described herein (e.g., moving the pieces of material from a wet state to a dry state while they are in contact with one another). For example, a weight, or other object, can be placed on the second piece of material over the passageway defined by the divider such that the first and second pieces of material contact one another. Any suitable technique or method of drying a material can be used to move a first piece of material and/or a second piece of material from a wet state to a dry state, such as laminar flow hoods, freeze-drying processes, lyophilization, and any other technique or method of drying considered suitable for a particular embodiment, such as those described herein.

While step 710 has been described as forming a contact interface that extends between the first piece of material and the second piece of material to attach the first piece of material to the second piece of material, step 710 can alternatively comprise attaching a portion of a first piece of material (e.g., biocompatible material) to a portion of a second piece of material (e.g., biocompatible material) at any suitable location (e.g., within a passageway defined by a divider, outward from an outer edge of a divider).

In alternative embodiments, an adhesive can be used to form a contact interface and attach first and second pieces of material to one another, or can be used to further support the attachment between first and second pieces of material (e.g., a lamination weld between first and second pieces of material). The adhesive can be applied to a portion of a piece of material prior, or subsequent, to step 708. For example, an adhesive can be applied to a piece of material at an intended location of attachment between first and second pieces of material (e.g., desired location of a contact interface (e.g., lamination) between pieces of material), a portion disposed within, or intended to be disposed within, a passageway of a divider, or any other portion of a piece of material considered suitable for a particular embodiment. Any suitable adhesive can be used to attach, or assist with an attachment between, first and second pieces of material and selection of a suitable adhesive can be based on various considerations, including the material forming a first piece of material and/or a second piece of material. Examples of adhesives considered suitable to apply to a first piece of material and/or a second piece of material include riboflavin, glutaraldehyde crosslinking agents, and any other adhesive considered suitable for a particular embodiment. For example, in embodiments in which riboflavin is being used as an adhesive, an additional step comprises applying UV light to the portion of the first piece of material and/or second piece of material on which the riboflavin has been disposed.

Step 712 can be accomplished by removing the divider from between the first piece of material and the second piece of material. The divider can be removed by sliding the divider over the first piece of material or the second piece of material and away from the first piece of material and the attached second piece of material. Alternatively, the divider can be removed from the first piece of material and the second piece of material by cutting the divider into one or more pieces and removing the one or more pieces from between the first piece of material and the second piece of material. Depending on the structural arrangement of a divider, subsequent to attachment between a first piece of material and a second piece of material and removal of the divider, a first piece of material, a majority of a first piece of material, or a minority of a first piece of material can be parallel to a second piece of material, extend from a location of attachment and toward a lengthwise axis of a medical device, or extend from a location of attachment and away a lengthwise axis of a medical device, and/or a second piece of material, a majority of a second piece of material, or a minority of a second piece of material can be parallel to a first piece of material, extend from a location of attachment and toward a lengthwise axis of a medical device, or extend from a location of attachment and away from a lengthwise axis of a medical device. The first piece of material and/or second piece of material can be biased to these configurations. Optionally, step 712 can be repeated if more than one medical device is being manufactured. An optional step that can be completed prior, or subsequent, to step 712 comprises cutting the first piece of material and/or second piece of material. This optional step can be accomplished using any suitable technique or method of cutting a piece of material, such as using a scalpel, using die cutting techniques, and any other technique or method considered suitable for a particular embodiment. For example, in embodiments in which medical device 1600, medical device 1700, or medical device 1800 are being manufactured, subsequent to an initial cut (e.g., die cut) being completed, another step comprises trimming the first piece of material and/or second piece of material to create one or more projections and/or notches. This optional step can be completed using a template and prior, or subsequent, to drying the material forming the medical device.

The divider can be formed of a material that prevents the first piece of material and the second piece of material from attaching to the divider during step 708 or step 710. For example, the divider can be formed of any suitable biocompatible material that prevents adhesion and/or attachment of a piece of material to the divider. Examples of biocompatible materials that can be used to form a divider include polymeric materials, such as Teflon®, fluoropolymer materials, and any other material considered suitable for a particular embodiment. In the illustrated embodiment, the first piece of material is formed of a first material, the second piece of material is formed of a second material, and the divider is formed of a third material that is different than the first and second materials. Optionally, the divider can define one or more perforations that extend from the fifth surface to the sixth surface in order to provide a user with a mechanism for easily removing the divider from between the first piece of material and the second piece of material subsequent to attachment of the first piece of material to the second piece of material.

An initial step 902 comprises obtaining a medical device. Another step 904 comprises applying a force on the medical device directed toward a perforation defined by tissue such that the medical device is introduced into the perforation. Another step 906 comprises implanting the medical device into the perforation such that only a first piece of material interfaces with and directly contacts a first surface of the tissue defining the perforation and only a second piece of material interfaces with and directly contacts a second surface of the tissue defining the tissue.

Step 902 can be accomplished by using any medical device considered suitable for a particular embodiment. For example, FIG. 14 illustrates a medical device 1000 that is similar to the medical device 110 illustrated in FIGS. 1 through 3. The medical device 1000 has first end 1002, a second end 1004, a first piece of material 1010 that includes a first surface 1012 and a second surface 1014, and a second piece of material 1040 that includes a third surface 1042 and a fourth surface 1044. Examples of medical devices considered suitable to complete step 902 include medical device 100, medical device 200, medical device 300, medical device 400, medical device 500, medical device 600, medical device 800, medical device 1000, medical device 1400, medical device 1500, medical device 1600, medical device 1700, medical device 1800, variations of medical devices described herein, and any other medical devices considered suitable for a particular embodiment.

Step 904 can be accomplished by using any suitable technique and/or method of introducing a medical device into a perforation defined by tissue (e.g., tissue defining tympanic membrane). For example, a user can use forceps, or another tool, to grasp a medical device and apply a force on the medical device such that it is advanced towards a perforation defined by tissue, as shown in FIG. 14, introduced through the perforation, and directly contacts the tissue. This step can be accomplished such that a first portion of the medical device underlays the tissue defining the perforation (e.g., first piece of material or second piece of material), a second portion is partially disposed within the perforation (e.g., contact interface, location of attachment), and a third portion of the medical device overlays the tissue defining the perforation (e.g., first piece of material or second piece of material). FIG. 14 illustrates a force being applied on the medical device 1000 that is directed toward the perforation 1200 defined by the tissue 1100. Optionally, a force can be applied on the third surface 1042 of the second piece of material 1040 of a medical device that is directed toward the perforation. Optionally, the first piece of material 1010 and/or the second piece of material 1040 can be grasped by a medical tool (e.g., forceps) during step 904 while a user applies a force onto the medical device in order to implant the medical device within the perforation defined by the tissue.

Step 904 can vary depending on the medical device being implanted in a perforation. For example, in embodiments in which medical device 1600 is being implanted in a perforation, a user can grasp the projections 1684, 1686, 1688, 1690 on the second piece of material 1640 using a tool (e.g., forceps). Subsequently, a force can be applied on the tool directed toward the perforation until a portion, or the entirety, of the first piece of material 1610 underlays the tissue that defines the perforation (e.g., is disposed between the tissue that defines the perforation and a cavity (e.g., tympanic cavity)), a portion of the medical device 1600 is disposed within the perforation (e.g., contact interface, location of attachment), and the second piece of material 1640 overlays the tissue that defines the perforation (e.g., is disposed between the tissue that defines the perforation and a bodily passage (e.g., ear canal)). In embodiments in which medical device 1700 is being implanted in a perforation, a user can grasp the projections 1772, 1774 on the first piece of material 1710 using a tool (e.g., forceps). Subsequently, a force can be applied on the tool directed toward the perforation until a portion, or the entirety, of the second piece of material 1740 underlays the tissue that defines the perforation, a portion of the medical device 1700 is disposed within the perforation (e.g., contact interface, location of attachment), and the first piece of material 1710 overlays the tissue that defines the perforation. In embodiments in which medical device 1800 is being implanted in a perforation, a user can grasp the projections 1884, 1886 on the second piece of material 1840 using a tool (e.g., forceps). Subsequently, a force can be applied on the tool directed toward the perforation until a portion, or the entirety, of the first piece of material 1810 underlays the tissue that defines the perforation, a portion of the medical device 1800 is disposed within the perforation (e.g., contact interface, location of attachment), and the second piece of material 1840 overlays the tissue that defines the perforation.

Step 906 can be accomplished by positioning the first piece of material of the medical device such that only the first piece of material directly contacts the first surface of the tissue and the second piece of material of the medical device such that only the second piece of material directly contacts the second surface of the tissue. FIG. 15 illustrates the medical device 1000 implanted in the perforation 1200 defined by the tissue 1100. Once implanted, only the second surface 1014 of the first piece of material 1010 directly contacts the first surface 1102 of the tissue 1100. In addition, once implanted, only the fourth surface 1044 of the second piece of material 1040 directly contacts the second surface 1104 of the tissue 1100. Upon implantation, each of the first surface 1012 and the third surface 1042 is directed away from the perforation 1200 defined by the tissue 1100 such that the first surface 1012 faces the tympanic cavity and the third surface 1042 faces the ear canal. In embodiments in which medical device 1600 is being implanted, only the second surface 1614 of the first piece of material 1610 directly contacts the first surface 1102 of the tissue 1100 and only the fourth surface 1644 of the second piece of material 1640 directly contacts the second surface 1104 of the tissue 1100 such that each of the first surface 1612 and the third surface 1642 is directed away from the perforation 1200 defined by the tissue 1100 and the first surface 1612 faces the tympanic cavity and the third surface 1642 faces the ear canal. In embodiments in which medical device 1700 is being implanted, only the fourth surface 1744 of the second piece of material 1740 directly contacts the first surface 1102 of the tissue 1100 and only the second surface 1714 of the first piece of material 1710 directly contacts the second surface 1104 of the tissue 1100 such that each of the first surface 1712 and the third surface 1742 is directed away from the perforation 1200 defined by the tissue 1100 and the third surface 1742 faces the tympanic cavity and the first surface 1712 faces the ear canal. In embodiments in which medical device 1700 is being implanted and the second piece of material 1740 does not advance through the perforation, an optional step comprises applying a force on a tool directed through a notch 1776, 1778 defined by the first piece of material 1710 and on the second piece of material 1740 such that the second piece of material 1740 is advanced through the perforation. In embodiments in which medical device 1800 is being implanted, only the second surface 1814 of the first piece of material 1810 directly contacts the first surface 1102 of the tissue 1100 and only the fourth surface 1844 of the second piece of material 1840 directly contacts the second surface 1104 of the tissue 1100 such that each of the first surface 1812 and the third surface 1842 is directed away from the perforation 1200 defined by the tissue 1100 and the first surface 1812 faces the tympanic cavity and the third surface 1842 faces the ear canal. While various examples of the positioning of a medical device relative to first and second surfaces of tissue have been described, a medical device can be implanted in any suitable orientation. For example, only a first piece of material (e.g., the second surface 1014 of the first piece of material 1010) or only a second piece of material (e.g., the fourth surface 1044 of the second piece of material 1040) of a medical device can directly contact a first surface of tissue defining a perforation and only a second piece of material (e.g., the fourth surface 1044 of the second piece of material 1040) or a first piece of material (e.g., the second surface 1014 of the first piece of material 1010) of the medical device can directly contact a second surface of the tissue such that each of the first surface of the first piece of material and the third surface of the second piece of material is directed away from the perforation defined by the tissue. In embodiments in which the first piece of material contacts the first surface of the tissue, the first surface faces the tympanic cavity and the third surface faces the ear canal. In embodiments in which the second piece of material contacts the first surface of the tissue, the first surface faces the ear canal and the third surface faces the tympanic cavity.

The structural arrangement of the medical devices described herein allow for implantation in a perforation defined by tissue without use of conventional materials (i.e. gel packing materials) and provide a medical device that is a unitary component, preventing separation of the first piece of material from the second piece of material during use. Moreover, the structural arrangement of the medical devices described herein define solid flanges (e.g., solid pieces of material from the location of attachment to an outer edge of the piece of material that are uninterrupted and free of any slits or cuts) that increase the contact, and attachment, between a medical device and tissue defining a perforation relative to medical devices that do not define solid flanges. In addition, the structural arrangement of the medical devices described herein allow users to utilize a local anesthetic in a desired location rather than administering a general anesthetic to accomplish implantation of a medical device.

Figure 16:
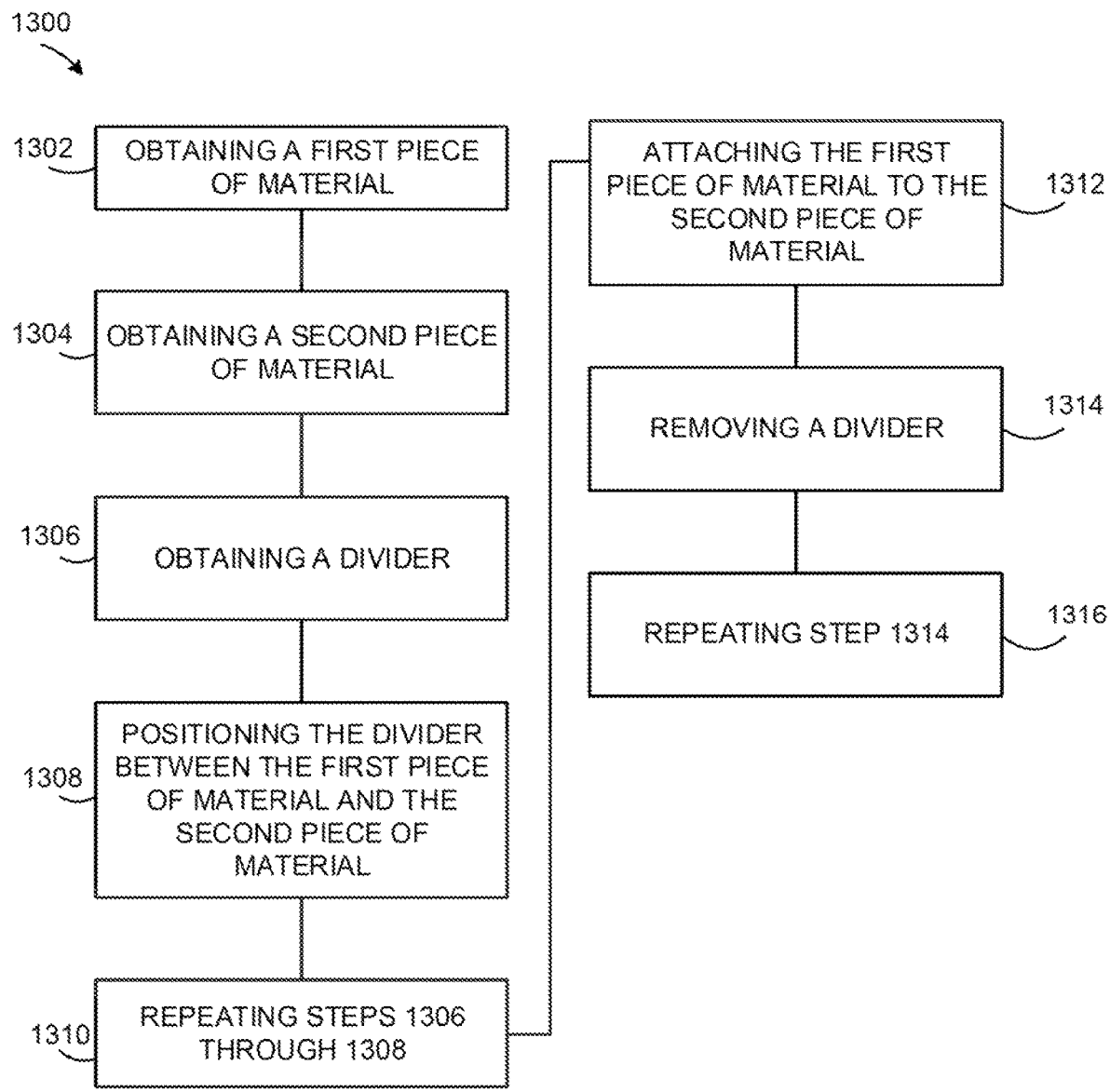
FIG. 16 is a schematic illustration of another example method of manufacturing a medical device.

FIG. 16 illustrates a schematic illustration of an example method 1300 of manufacturing multiple medical devices.

An initial step 1302 comprises obtaining a first piece of material. Another step 1304 comprises obtaining a second piece of material. Another step 1306 comprises obtaining a divider that defines a passageway that extends through the divider. Another step 1308 comprises positioning the divider between each of the first piece of material and the second piece of material such that the divider contacts the first piece of material and the second piece of material. Another step 1310 comprising repeating steps 1306 through 1308 until a desired number of dividers are positioned between the first piece of material and second piece of material to create a desired number of medical devices. Another step 1312 comprises attaching the first piece of material to the second piece of the material within the passageway defined by each divider disposed between the first piece of material and the second piece of material. Another step 1314 comprises removing a divider from between the first piece of material and the second piece of material. Another step 1316 comprises repeating step 1314 until each divider disposed between the first and second pieces of material is removed.

Step 1302 can be accomplished using any first piece of material considered suitable for a particular embodiment. Examples of first pieces of material considered suitable to complete step 1302 include first piece of material 110, first piece of material 210, first piece of material 310, first piece of material 410, first piece of material 510, first piece of material 610, first piece of material 810, first piece of material 1010, first piece of material 1410, first piece of material 1510, first piece of material 1610, first piece of material 1710, first piece of material 1810, variations of the first pieces of materials described herein, pieces of material sized and configured to allow a plurality of dividers to be placed on the piece of material, and any other pieces of material considered suitable for a particular embodiment.

Step 1304 can be accomplished using any second piece of material considered suitable for a particular embodiment. Examples of second pieces of material considered suitable to complete step 1304 include second piece of material 140, second piece of material 240, second piece of material 340, second piece of material 440, second piece of material 540, second piece of material 640, second piece of material 840, second piece of material 1040, second piece of material 1440, second piece of material 1540, second piece of material 1640, second piece of material 1740, second piece of material 1840, variations of the second pieces of material described herein, pieces of material sized and configured to allow a plurality of dividers to be placed on the piece of material, and any other pieces of material considered suitable for a particular embodiment.

Step 1306 can be accomplished using any divider considered suitable for a particular embodiment. Examples of dividers considered suitable to complete step 1306 include divider 870, divider 1910, variations of the dividers described herein, and any other dividers considered suitable for a particular embodiment.

Step 1308 can be accomplished by positioning the divider between the first piece of material and the second piece of material, as described herein with respect to step 708.

Figure 17:
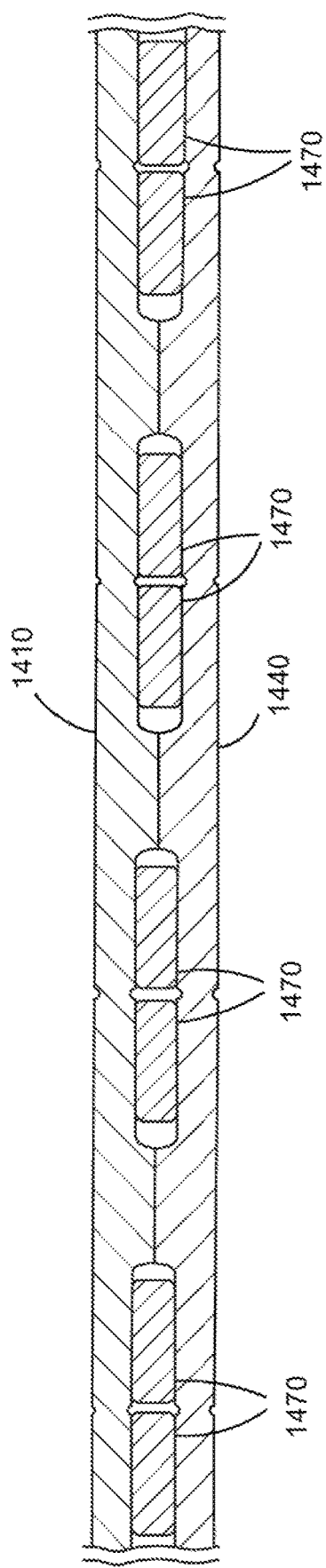
FIG. 17 is a partial cross-sectional view of a set of dividers disposed between a first piece of material and a second piece of material.

Step 1310 can be accomplished by repeating steps 1306 through 1308 until a desired number of dividers are positioned between the first piece of material and second piece of material. The first and second pieces of material are sized and configured to allow multiple dividers to be positioned between the pieces of material. For example, FIG. 17 illustrates a set of dividers 1470 positioned between a first piece of material 1410 and a second piece of material 1440.

Step 1312 can be accomplished as described herein in step 710. For example, by applying a force (e.g., vacuum) on each of the first piece of material, the second piece of material, and each divider simultaneously such that the first piece of material becomes attached to the second piece of material within the passageway defined by each divider. The force applied on each of the first piece of material, the second piece of material, and each of the dividers simultaneously allows a portion of the first piece of material (e.g., a portion of the second surface) and a portion of the second piece of material (e.g., a portion of the fourth surface) to transition from a first position to a second position relative to the passageway of each divider. In the first position, the first piece of material is not contacting the second piece of material and each of the second surface and the fourth surface is positioned outside of the passageway of each divider. As the first piece of material (e.g., second surface) and the second piece of material (e.g., fourth surface) transition from the first position to the second position, the portion of each of the first piece of material (e.g., the portion of the second surface) and the portion of the second piece of material (e.g., the portion of the fourth surface) move toward one another and into the passageway of each divider. In the second position, the portion of the first piece of material (e.g., the portion of the second surface) is disposed within the passageway defined by each divider and the portion of the second piece of material (e.g., the portion of the fourth surface) is disposed within the passageway defined by each divider such that each of the first piece of material and the second piece of material directly contact one another (e.g., second surface and fourth surface directly contact one another) within the passageway defined by each divider. In addition, in the second position, a second portion of the first piece of material and a second portion of the second piece of material are disposed outside of the passageway defined by each divider and directly contact each divider. While step 1312 has been described as attaching the first piece of material to the second piece of the material within the passageway defined by each divider disposed between the first piece of material and the second piece of material, step 1312 can alternatively comprise forming a contact interface that extends between the first piece of material and the second piece of material to attach the first piece of material to the second piece of material.

Step 1314 can be accomplished by removing each divider of the set of dividers from between the first piece of material and the second piece of material. A divider can be removed from the first piece of material and the second piece of material as described in step 712. For example, a divider can be removed from the first piece of material and the second piece of material by cutting each divider into one or more pieces and removing the one or more pieces from between the first piece of material and the second piece of material. A user, such as a surgeon, can remove each divider of the set of dividers from the first piece of material and the second piece of material with a desired medical tool (e.g. a biopsy punch) to create a medical device.

Step 1316 can be accomplished by repeating step 1314 until the desired number of dividers disposed between the first piece of material and the second piece of materials in steps 1306 through 1310 are removed from between the first piece of material and second piece of material.

Figure 18:
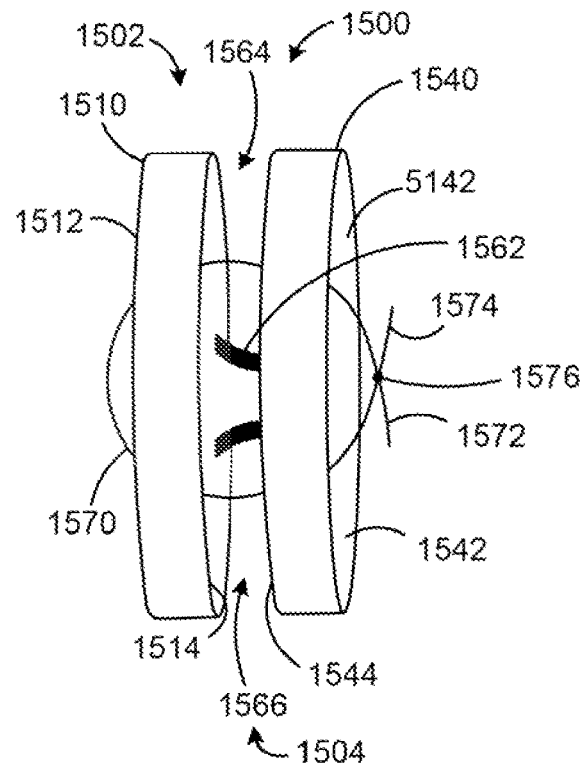
FIG. 18 is a perspective view of another example medical device.
Figure 19:
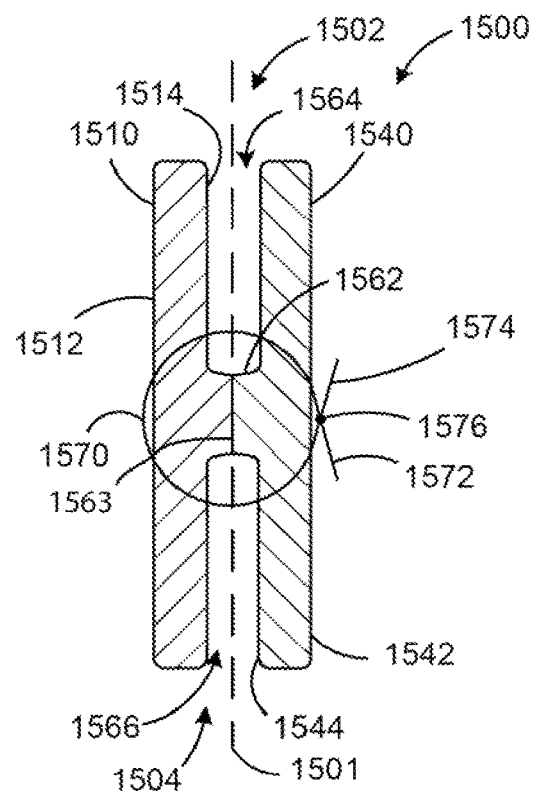
FIG. 19 is a cross-sectional view of the medical device illustrated in FIG. 18 taken along the lengthwise axis of the medical device.

FIGS. 18 and 19 illustrate another example medical device 1500 that has a first piece of material 1510 attached to a second piece of material 1540 at a location of attachment 1562. A contact interface 1563 is disposed at the location of attachment 1562, comprises an attachment between the first and second pieces of material 1510, 1540, and extends between the first piece of material 1510 and the second piece of material 1540. The medical device 1500 is similar to the medical device 100 illustrated in FIGS. 1 through 3 and described above, except as detailed below. The medical device has a first end 1502, a second end 1504, a lengthwise axis 1501 that extends from the first end 1502 to the second end 1504, a first recessed region 1564 that extends from the first end 1502 to the location of attachment 1562, a second recessed region 1566 that extends from the second end 1504 to the location of attachment 1562, and a suture 1570. The first piece of material 1510 has a first surface 1512 and a second surface 1514. The second piece of material 1540 has a third surface 1542 and a fourth surface 1544. The suture 1570 has a suture first end 1572 and a suture second end 1574.

The suture 1570 is attached to the first and second pieces of material 1510, 1540 such that a portion of the suture passes through the second piece of material 1540, through the first recessed region 1564, through the first piece of material 1510, through the first piece of material 1510 again, through the second recessed region 1566, and through the second piece of material 1540. Once the suture first and second ends 1572, 1574 are disposed adjacent the third surface 1542, a portion of the suture 1570 that extends from the suture first end 1572 toward the suture second end 1574 and a portion of the suture 1570 that extends from the suture second end 1574 toward the suture first end 1572 are attached together at an attachment point 1576. The inclusion of the suture 1570 provides an additional mechanical connection between the first piece of material 1510 and the second piece of material 1540 providing additional support and strength between the first piece of material 1510 and the second piece of material 1540. Furthermore, the suture 1570 provides additional structure to manipulate during implantation of the medical device 1500 into a perforation defined by tissue (e.g., perforation defined by tympanic membrane).

While a portion of the suture 1570 that extends from the suture first end 1572 toward the suture second end 1574 and a portion of the suture 1570 that extends from the suture second end 1574 toward the suture first end 1572 have been illustrated as being attached, any suitable portion of a suture can be attached to another portion of a suture and any suitable type or method attachment can be used. Selection of a suitable attachment can be based on various considerations, including the shape, size, and configuration of a medical device. Examples of suitable attachments include fastening a first portion of a suture to a second portion of the suture, knotting a first portion of a suture to a second portion of the suture, joining a first portion of a suture to a second portion of the suture, and any other attachments considered suitable for a particular embodiment.

Figure 20:
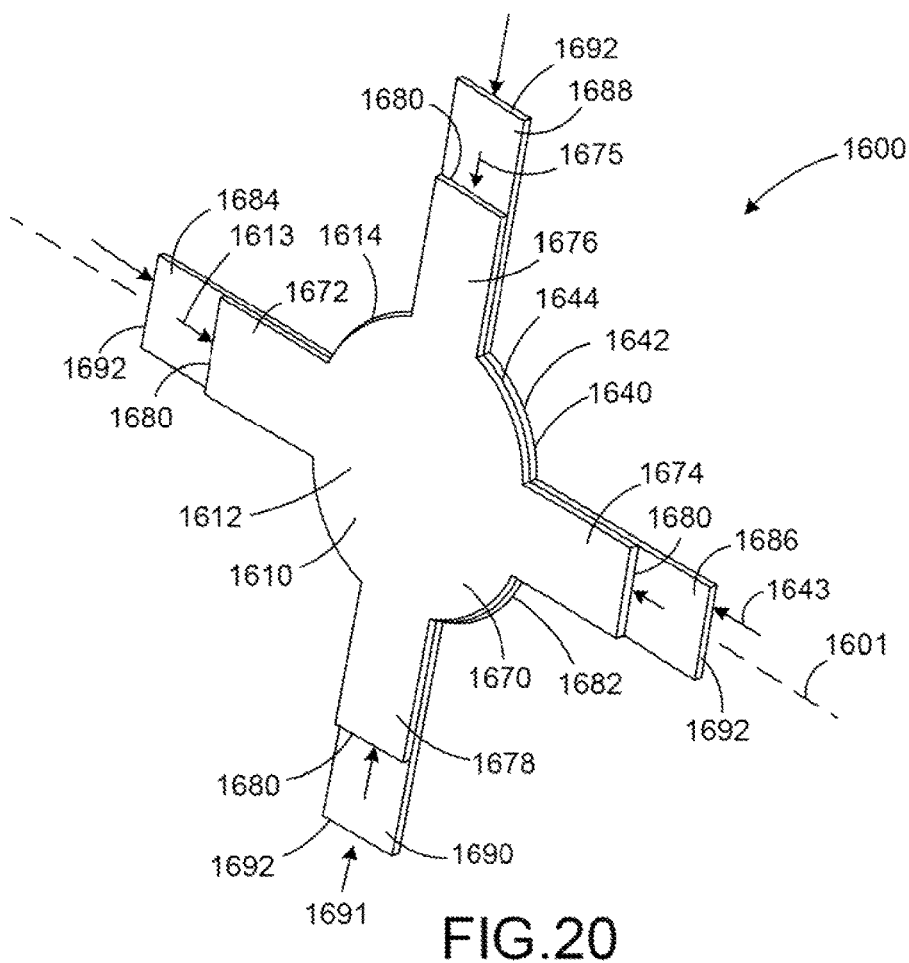
FIG. 20 is a perspective view of another example medical device.

FIG. 20 illustrates another example medical device 1600 that has a lengthwise axis 1601 and a first piece of material 1610 attached to a second piece of material 1640. The medical device 1600 is similar to the medical device 100 illustrated in FIGS. 1 through 3 and described above, except as detailed below. The first piece of material 1610 has a first surface 1612, a second surface 1614, a first length 1613, a first main body 1670, a first projection 1672, a second projection 1674, a third projection 1676, a fourth projection 1678, and a first height 1675. Each of the projections 1672, 1674, 1676, 1678 extends from the first main body 1670 to a projection end 1680. The first length 1613 extends from the projection end 1680 of the first projection 1672 to the projection end 1680 of the second projection 1674. Each of the first and second projections 1672, 1674 is disposed on an axis that is parallel to the lengthwise axis 1601. The first height 1675 extends from the projection end 1680 of the third projection 1676 to the projection end 1680 of the fourth projection 1678. Each of the third and fourth projections 1676, 1678 is disposed on an axis that is perpendicular to a plane that contains the lengthwise axis 1601. In the illustrated embodiment, the first length 1613 is equal to the first height 1675. However, alternative embodiment can include projections that do not have equal lengths.

The second piece of material 1640 has a third surface 1642, a fourth surface 1644, a second length 1643, a second main body 1682, a fifth projection 1684, a sixth projection 1686, a seventh projection 1688, an eighth projection 1690, and a second height 1691. Each of the projections 1684, 1686, 1688, 1690 extends from the second main body 1682 to a projection end 1692. The second length 1643 extends from the projection end 1692 of the fifth projection 1684 to the projection end 1692 of the sixth projection 1686. Each of the fifth and sixth projections 1684, 1686 is disposed on an axis that is parallel to the lengthwise axis 1601. The second height 1691 extends from the projection end 1692 of the seventh projection 1688 to the projection end 1692 of the eighth projection 1690. Each of the seventh and eighth projections 1688, 1690 is disposed on an axis that is perpendicular to a plane that contains the lengthwise axis 1601.

In the illustrated embodiment, the second length 1643 is equal to the second height 1691, the second length 1643 is greater than the first length 1613, and the second height 1691 is greater than the first height 1675. However, alternative embodiments can include projections that do not have equal lengths or can include a projection that has a length that is greater than, equal to, or less than a length of a projection of a first piece of material. The inclusion of projections 1672, 1674, 1676, 1678 on the first piece of material 1610 that have lengths that are less than the lengths of the projections included on a second piece of material allow for the medical device 1600 to be passed through a perforation such that the first piece of material 1610 is disposed within a cavity (e.g., tympanic cavity), the projections defined by the first piece of tissue 1610 act as an anchor, and the projections 1684, 1686, 1688, 1690 on the second piece of material 1640 are disposed within a bodily passage (e.g., ear canal). In addition, the inclusion of projections 1672, 1674, 1676, 1678 on the first piece of material 1610 and the projections 1684, 1686, 1688, 1690 on the second piece of material 1640 allow for increased handling of the medical device 1600 during implantation, as described herein. For example, the projections 1684, 1686, 1688, 1690 on the second piece of material 1640 can be grasped by forceps and used to advance the first piece of material 1610 through a perforation. Furthermore, each of the projections included on the medical device 1610 increases the contact area between the first and second pieces of material 1610, 1640 and the tissue defining a perforation.

A projection included on a medical device can have any suitable length, height, and/or width and selection of a suitable length, height, and width for a projection can be based on various considerations, including the intended use of the medical device. Examples of lengths and heights considered suitable for a projection include lengths and heights that are greater than, less than, or equal to 1 millimeter, 2 millimeters, 3 millimeters, 4 millimeters, 5 millimeters, those between about 1 millimeter and about 3 millimeters, those between about 2 millimeters and about 5 millimeters, and any other length or height considered suitable for a particular embodiment. Examples of widths considered suitable for a projection include widths that are greater than, less than, or equal to 1 millimeter, 2 millimeters, 3 millimeters, those between about 1 millimeter and about 3 millimeters, and any other width considered suitable for a particular embodiment.

While each of the first piece of material 1610 and the second piece of material 1640 have been illustrated as including four projections, a piece of material can include any suitable number of projections, having any suitable structural arrangement, positioned at any suitable location on a piece of material, and positioned at any suitable angle relative to a main body of a piece of material. Selection of a suitable number of projections to include on a piece of material, a suitable structural arrangement for a projection, a suitable location to position a projection, and a suitable angle to position a projection relative to a main body can be based on various considerations, including the material forming a piece of material and/or a location of a perforation within which a medical device is intended to be disposed. Examples of numbers of projections considered suitable to include on a medical device include one, more than one, two, a plurality, three, four, five, more than five, more than ten, and any other number considered suitable for a particular embodiment.

Figure 21:
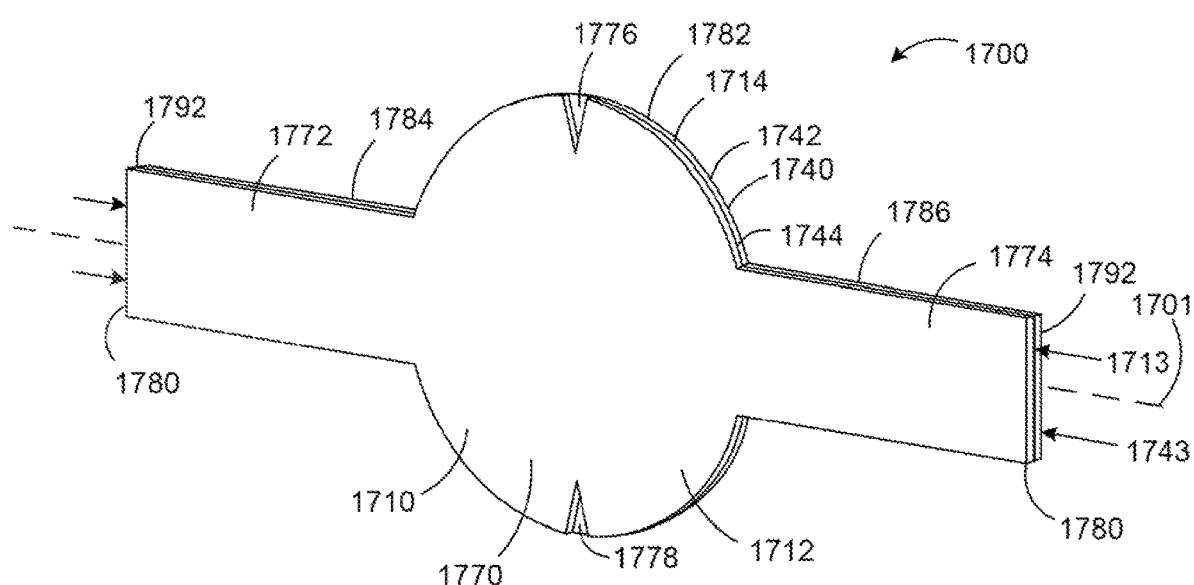
FIG. 21 is a perspective view of another example medical device.

FIG. 21 illustrates another example medical device 1700 that has a lengthwise axis 1701 and a first piece of material 1710 attached to a second piece of material 1740. The medical device 1700 is similar to the medical device 100 illustrated in FIGS. 1 through 3 and described above, except as detailed below. The first piece of material 1710 has a first surface 1712, a second surface 1714, a first length 1713, a first main body 1770, a first projection 1772, a second projection 1774, a first notch 1776, and a second notch 1778. Each of the projections 1772, 1774 extends from the first main body 1770 to a projection end 1780. The first length 1713 extends from the projection end 1780 of the first projection 1772 to the projection end 1780 of the second projection 1774. Each of the first and second projections 1772, 1774 is disposed on an axis that is parallel to the lengthwise axis 1701. In embodiments in which the second piece of material 1740 is disposed within a tympanic cavity (e.g., the third surface 1742 faces the tympanic cavity subsequent to implantation), each of the first and second notches 1776, 1778 provides a path through which a tool (e.g., forceps) can be used to apply a force on the second piece of material 1740 to push it through a perforation in tissue. Any suitable number of notches can be included on a piece of material.

The second piece of material 1740 has a third surface 1742, a fourth surface 1744, a second length 1743, a second main body 1782, a third projection 1784, and a fourth projection 1786. Each of the projections 1784, 1786 extends from the second main body 1782 to a projection end 1792. The second length 1743 extends from the projection end 1792 of the third projection 1784 to the projection end 1792 of the fourth projection 1786. Each of the third and fourth projections 1784, 1786 is disposed on an axis that is parallel to the lengthwise axis 1701. In the illustrated embodiment, the second length 1743 is equal to the first length 1713. However, alternative embodiments can include projections that do not have equal lengths. The inclusion of projections 1772, 1774 on the first piece of material 1710 and projections 1784, 1786 on the second piece of material 1740 provides a mechanism for handling the medical device 1700 during implantation, as described herein, and increases that contact area between the first and second pieces of material 1710, 1740 and the tissue defining a perforation.

Optionally, medical device 1700 can omit the inclusion of projections 1772, 1774, 1784, 1786 and/or include one or more slits in the second piece of material 1740. If included, each slit can be positioned at any suitable location on the second piece of material and extend from an outer edge of the piece of material and into the piece of material any suitable distance, such as distances equal to, greater than, or less than ⅛ the diameter of the piece of material, ¼ the diameter of the piece of material, ½ the diameter of the piece of material, and any other distance considered suitable for a particular embodiment. For example, a slit can be aligned with, or offset from a notch such that the slit is not aligned with the notch. In embodiments in which the second piece of material 1740 of this alternative embodiment is disposed within a tympanic cavity (e.g., the third surface 1742 faces the tympanic cavity subsequent to implantation), each of the first and second notches 1776, 1778 provides a path through which a tool (e.g., forceps) can be used to apply a force on the second piece of material 1740 to push it through a perforation in tissue. In addition, each of the slits included in the second piece of material allow for portions of the second piece of material to be passed through a perforation independently of other portions of the second piece of material, rather than requiring the entire piece of material to be passed through the perforation.

A notch included on a medical device can have any suitable width measured along an outer edge of a piece of material and depth measured from an outer edge of a piece of material and into the piece of material. Selection of a suitable width and/or depth for a notch can be based on various considerations, including the intended use of the medical device. Examples of widths considered suitable for a notch include widths that are greater than, less than, or equal to 1 millimeter, 2 millimeters, those between about 1 millimeter and about 2 millimeters, and any other width considered suitable for a particular embodiment. Examples of depths considered suitable for a notch include depths that are greater than, less than, or equal to 1 millimeter, 2 millimeters, 3 millimeters, 4 millimeters, 5 millimeters, those between about 1 millimeter and about 5 millimeters, and any other depth considered suitable for a particular embodiment. A slit included on a medical device can have any suitable depth measured from an outer edge of a piece of material and into the piece of material and selection of a suitable depth for a slit can be based on various considerations, including the intended use of the medical device. Examples of depths considered suitable for a slit include depths that are greater than, less than, or equal to 1 millimeter, 2 millimeters, 3 millimeters, 4 millimeters, 5 millimeters, those between about 1 millimeter and about 5 millimeters, and any other depth considered suitable for a particular embodiment.

Figure 22:
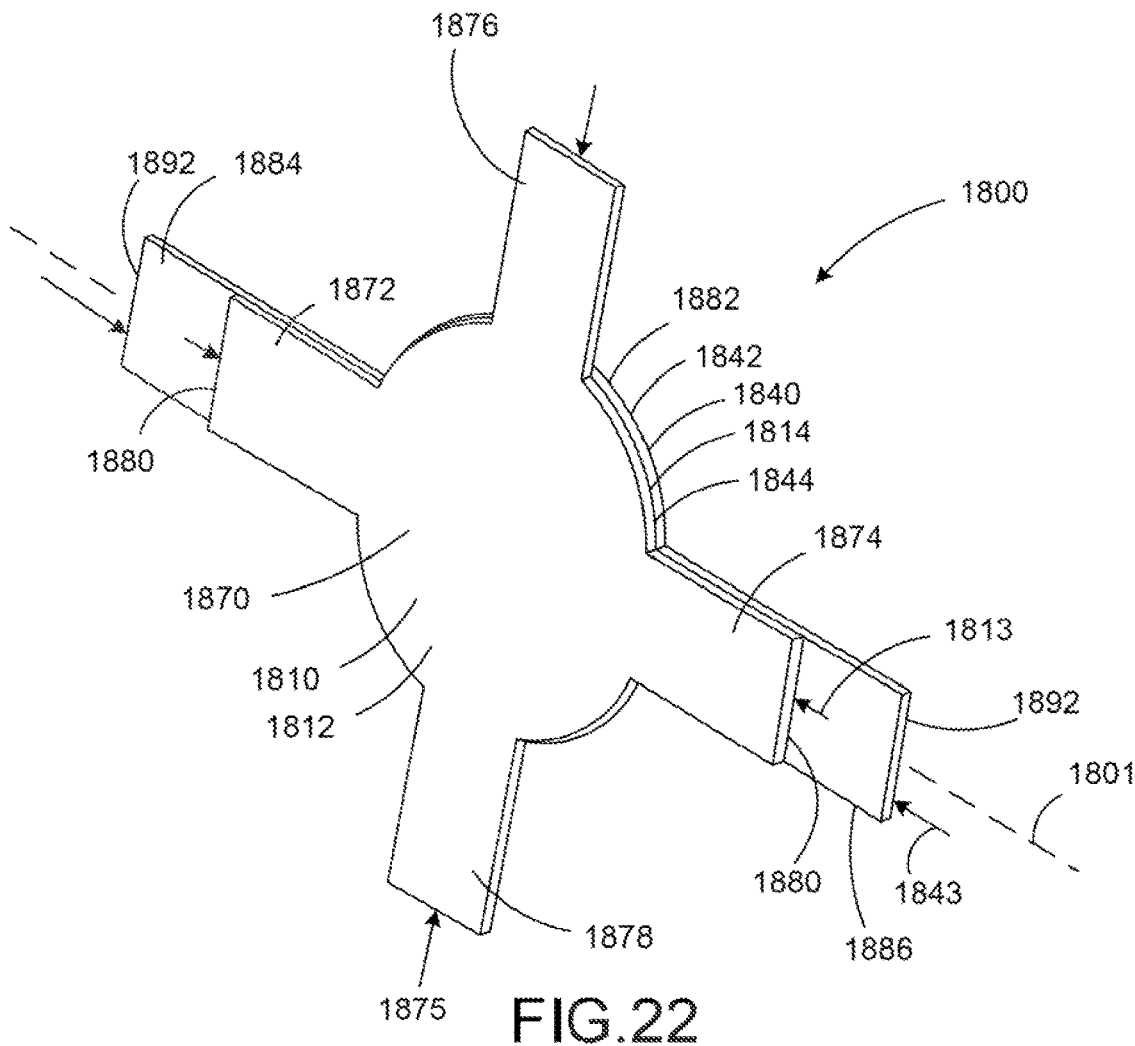
FIG. 22 is a perspective view of another example medical device.

FIG. 22 illustrates another example medical device 1800 that has a lengthwise axis 1801 and a first piece of material 1810 attached to a second piece of material 1840. The medical device 1800 is similar to the medical device 1600 illustrated in FIG. 20 and described above, except as detailed below. In the illustrated embodiment, the first piece of material 1810 has a first surface 1812, a second surface 1814, a first length 1813, a first main body 1870, a first projection 1872, a second projection 1874, a third projection 1876, a fourth projection 1878, and a first height 1875 and the second piece of material 1840 has a third surface 1842, a fourth surface 1844, a second length 1843, a second main body 1882, a fifth projection 1884, and a sixth projection 1886. Each of the projections 1872, 1874, 1876, 1878 defined by the first piece of material 1810 extends from the first main body 1870 to a projection end 1880. The first length 1813 extends from the projection end 1880 of the first projection 1872 to the projection end 1880 of the second projection 1874. Each of the projections 1884, 1886 defined by the second piece of material 1840 extends from the second main body 1882 to a projection end 1892. The second length 1843 extends from the projection end 1892 of the fifth projection 1884 to the projection end 1892 of the sixth projection 1886. In the illustrated embodiment, the second length 1843 is greater than the first length 1813.

The inclusion of projections 1872, 1874, 1876, 1878 on the first piece of material 1810 that have lengths that are less than the lengths of the projections 1884, 1886 included on a second piece of material 1840 allow for the medical device 1800 to be passed through a perforation such that the first piece of material 1810 is disposed within a cavity (e.g., tympanic cavity), the projections defined by the first piece of tissue 1810 act as an anchor, and the projections 1884, 1886 on the second piece of material 1840 are disposed within a bodily passage (e.g., ear canal). In addition, the inclusion of projections 1872, 1874, 1876, 1878 on the first piece of material 1810 and the projections 1884, 1886 on the second piece of material 1840 allow for increased handling of the medical device 1800 during implantation, as described herein. For example, the projections 1884, 1886 on the second piece of material 1840 can be grasped by forceps and used to advance the first piece of material 1810 through a perforation. Moreover, the inclusion of projections 1872, 1874, 1876, 1878 on the first piece of material 1810 and the projections 1884, 1886 on the second piece of material 1840 increases that contact area between the first and second pieces of material 1810, 1840 and the tissue defining a perforation.

FIG. 23 illustrates another example divider 1910 that is similar to the divider 870 illustrated in FIG. 11 and described above, except as detailed below. The divider 1910 has a first surface 1912, a second surface 1914, and defines a width 1916, a thickness 1918, and a passageway 1920. The thickness 1918 extends from the first surface 1912 to the second surface 1914. The passageway 1920 extends through the thickness 1918 of the divider 1910 from the first surface 1912 to the second surface 1914. A divider can have any suitable thickness and selection of a suitable thickness can be based on various considerations, including the type of perforation being treated using a medical device created using a divider. In the illustrated embodiment, the divider 1910 is a rectangular prism that defines the passageway 1920 and can be used to create medical devices, such as those described illustrated in FIGS. 20, 21, and 22 that include one or more projections, or medical devices that have enlarged surface areas.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A method of manufacturing an implantable medical device, comprising:
    obtaining a first piece of material;
    obtaining a second piece of material;
    obtaining a divider defining a passageway extending through the divider;
    positioning the divider between the first piece of material and the second piece of material such that the divider contacts the first piece of material and the second piece of material;
    forming a contact interface that extends between the first piece of material and the second piece of material to attach the first piece of material to the second piece of material within the passageway defined by the divider;
    removing the divider from between the first piece of material and the second piece of material; and
    after the removing the divider step, providing the medical device to a user of the medical device for implantation in a subject.

2. The method of claim 1, wherein forming a contact interface that extends between the first piece of material and the second piece of material to attach the first piece of material to the second piece of material comprises forming a contact interface that extends between the first piece of material and the second piece of material to attach the first piece of material to the second piece of material within the passageway defined by the divider, wherein the first piece of material is oriented in a first plane, wherein the second piece of material is oriented in a second plane that is substantially parallel to the first plane, and wherein the passageway through the divider is oriented in a third plane that is not substantially parallel to the first plane of the second plane.

3. The method of claim 1, wherein the first piece of material has a first surface and a second surface opposably facing the first surface;
    wherein the second piece of material has a third surface and a fourth surface opposably facing the third surface;
    wherein the divider has a fifth surface, a sixth surface opposably facing the fifth surface, and the passageway extends from the fifth surface to the sixth surface; and
    wherein positioning the divider between the first piece of material and the second piece of material such that the divider contacts the first piece of material and the second piece of material comprises positioning the divider between the first piece of material and the second piece of material such that the fifth surface contacts the second surface and the sixth surface contacts the fourth surface.

4. The method of claim 1, wherein the first piece of material is formed of a first material and the second piece of material is formed of a second material that is the same as the first material.

5. The method of claim 4, wherein the divider is formed of a third material; and
    wherein the third material is different from the first and second materials.

6. The method of claim 5, wherein the third material is a polymeric material.

7. The method of claim 4, wherein each of the first and second materials is extracellular matrix material.

8. The method of claim 4, wherein each of the first and second materials is small intestinal submucosa.

9. The method of claim 1, wherein the first piece of material has a first length and the second piece of material has a second length; and wherein the first length is greater than the second length.

10. The method of claim 1, wherein the divider has a width measured from the passageway to an outer edge of the divider; and wherein the width is between about 1 millimeter and about 2 millimeters.

11. The method of claim 1, wherein forming a contact interface that extends between the first piece of material and the second piece of material to attach the first piece of material to the second piece of material comprises forming the contact interface that extends between the first piece of material and the second piece of material to attach the first piece of material to the second piece of material such that a majority of the first piece of material is parallel to a majority of the second piece of material.

12. The method of claim 1, wherein said medical device has a lengthwise axis; and wherein the first piece of material is biased to a concave configuration relative to said lengthwise axis.

13. The method of claim 1, wherein said medical device has a lengthwise axis; and wherein the first piece of material is biased to a convex configuration relative to said lengthwise axis.

14. The method of claim 1, wherein forming a contact interface that extends between the first piece of material and the second piece of material to attach the first piece of material to the second piece of material is accomplished by applying a vacuum to the first piece of material, the second piece of material, and the divider until a portion of the first piece of material becomes attached to a portion of the second piece of material within the passageway.

15. The method of claim 1, wherein forming a contact interface that extends between the first piece of material and the second piece of material to attach the first piece of material to the second piece of material is accomplished by moving each of the first piece of material and the second piece of material from a wet state to a dry state such that the first piece of material becomes attached to the second piece of material within the passageway.

16. The method of claim 1, further comprising cutting the first piece of material and the second piece of material while the divider is disposed between the first piece of material and the second piece of material.

17. A method of manufacturing an implantable medical device, comprising:

obtaining a first piece of biocompatible material;
obtaining a second piece of biocompatible material;
obtaining a divider defining a passageway extending through the divider;
positioning the divider between the first piece of biocompatible material and the second piece of biocompatible material such that the divider contacts the first piece of biocompatible material and the second piece of biocompatible material;
attaching a portion of the first piece of biocompatible material to a portion of the second piece of biocompatible material within the passageway defined by the divider; and
removing the divider from between the first piece of biocompatible material and the second piece of biocompatible material; and
after the removing the divider step, providing the medical device to a user of the medical device for implantation in a subject;
wherein each of the first piece of biocompatible material and the second piece of biocompatible material is formed of an extracellular matrix material; and
wherein the divider is formed of a polymeric material.

18. A method of manufacturing an implantable medical device, comprising:

obtaining a first piece of biocompatible material;
obtaining a second piece of biocompatible material;
obtaining a divider defining a passageway extending through the divider;
positioning the divider between the first piece of biocompatible material and the second piece of biocompatible material such that the divider contacts the first piece of biocompatible material and the second piece of biocompatible material;
attaching a portion of the first piece of biocompatible material to a portion of the second piece of biocompatible material within the passageway defined by the divider;
removing the divider from between the first piece of biocompatible material and the second piece of biocompatible material; and
after the removing the divider step, providing the medical device to a user of the medical device for implantation in a subject;
wherein each of the first piece of biocompatible material and the second piece of biocompatible material is formed of small intestinal submucosa; and
wherein the divider is formed of polytetrafluoroethylene.

* * * * *